(12) United States Patent
Ushigome

(10) Patent No.: US 8,941,923 B2
(45) Date of Patent: Jan. 27, 2015

(54) DIFFRACTIVE OPTICAL ELEMENT, OPTICAL SYSTEM, AND OPTICAL APPARATUS

(75) Inventor: Reona Ushigome, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 211 days.

(21) Appl. No.: 13/157,751

(22) Filed: Jun. 10, 2011

(65) Prior Publication Data

US 2011/0304918 A1 Dec. 15, 2011

(30) Foreign Application Priority Data

Jun. 11, 2010 (JP) ................................. 2010-133972

(51) Int. Cl.
*G02B 5/18* (2006.01)
*G02B 27/42* (2006.01)
*G02B 27/00* (2006.01)
*G02B 27/44* (2006.01)

(52) U.S. Cl.
CPC .............. *G02B 5/1895* (2013.01); *G02B 27/42* (2013.01); *G02B 27/4272* (2013.01); *G02B 27/0037* (2013.01); *G02B 27/44* (2013.01)
USPC ............................ 359/576; 359/569; 359/571

(58) Field of Classification Search
CPC .... G02B 27/42; G02B 27/4272; G02B 27/44; G02B 5/1866; G02B 5/1895
USPC .......... 359/565, 566, 569, 575, 576, 571, 580
See application file for complete search history.

(56) References Cited

U.S. PATENT DOCUMENTS

| | | | |
|---|---|---|---|
| 3,237,508 A | 3/1966 | Keller et al. | |
| 3,942,873 A | 3/1976 | Shimotakahara | |
| 4,555,162 A | 11/1985 | Aldrich et al. | |
| 6,529,321 B2 | 3/2003 | Pan et al. | |

(Continued)

FOREIGN PATENT DOCUMENTS

| JP | 2003-240931 A | 8/2003 |
|---|---|---|
| JP | 2003-315526 A | 11/2003 |

(Continued)

OTHER PUBLICATIONS

Ushigome, Reona. "Diffractive Optical Element, Optical System, and Optical Apparatus" Specification and Drawings of unpublished related co-pending U.S. Appl. No. 13/157,686, filed Jun. 10, 2011, pp. 1-75.

(Continued)

*Primary Examiner* — Audrey Y Chang
(74) *Attorney, Agent, or Firm* — Rossi, Kimms & McDowell LLP

(57) ABSTRACT

A diffractive optical element includes a first diffraction grating and a second diffraction grating which are made of materials different from each other and are stacked in an optical axis direction, and a thin film which is arranged at least part of an interface between the first diffraction grating and the second diffraction grating, includes a single layer or multiple layers made of a material different from that of each of the first and second diffraction gratings, and is transparent to light of a working wavelength range. $nd1<nd2$ and $0.5<nd3-nd2<0.8$ are satisfied, where $nd1$ is a refractive index of the material of the first diffraction grating to d-line, $nd2$ is a refractive index of the material of the second diffraction grating to the d-line, and $nd3$ is a maximum refractive index of the material of one layer of the thin film to the d-line.

17 Claims, 17 Drawing Sheets

(56) References Cited

U.S. PATENT DOCUMENTS

| | | | |
|---|---|---|---|
| 6,587,272 B2 | 7/2003 | Nakai | |
| 6,641,985 B2 | 11/2003 | Unno et al. | |
| 6,650,477 B2 * | 11/2003 | Nakai | 359/569 |
| 6,873,463 B2 * | 3/2005 | Nakai | 359/574 |
| 7,006,291 B2 * | 2/2006 | Hori et al. | 359/580 |
| 7,042,642 B2 * | 5/2006 | Tokoyoda et al. | 359/576 |
| 7,599,133 B2 * | 10/2009 | Nakai et al. | 359/796 |
| 7,965,444 B2 * | 6/2011 | Boettiger | 359/575 |
| 8,064,138 B2 | 11/2011 | Taira et al. | |
| 2009/0027776 A1 * | 1/2009 | Schall et al. | 359/571 |
| 2010/0189956 A1 | 7/2010 | Etori et al. | |
| 2011/0304915 A1 * | 12/2011 | Ushigome | 359/576 |

FOREIGN PATENT DOCUMENTS

| | | |
|---|---|---|
| JP | 2004-013081 A | 1/2004 |
| JP | 2004-126394 A | 4/2004 |
| JP | 2005-062717 A | 3/2005 |
| JP | 2005-115176 A | 4/2005 |
| JP | 2009-217139 A | 9/2009 |
| WO | 2012/162880 A1 | 12/2012 |

OTHER PUBLICATIONS

Ushigome, Reona. "Diffractive Optical Element, Optical System, and Optical Apparatus" Specification and Drawings of unpublished related co-pending U.S. Appl. No. 13/157,628, filed Jun. 10, 2011, pp. 1-79.

Ushigome, Reona. "Diffractive Optical Element, Optical System, and Optical Apparatus" Specification and Drawings of unpublished related co-pending U.S. Appl. No. 13/157,664, filed Jun. 10, 2011, pp. 1-95.

Interference in Thin Film, Westminster College SIM, Ligh 7-4 available from the following website: http://www.westminster.edu/acad/sim/pdf/SINTERFERENCEINTHINFILM.pdf Cited in related application U.S. Appl. No. 13/157,628.

Total International Reflection from http://en.wikipedia.org/wiki/Total_internal_reflection Cited in related application U.S. Appl. No. 13/157,628.

\* cited by examiner

DIFFRACTIVE OPTICAL ELEMENT, OPTICAL SYSTEM, AND OPTICAL APPARATUS

BACKGROUND OF THE INVENTION

1. Field of the Invention

The present invention relates to a diffractive optical element used for a lens in an optical system, the optical system, and an optical apparatus having the optical system.

2. Description of the Related Art

For a diffractive optical element used for a lens in an optical system, it is known to adhere two diffraction gratings closely to each other and to properly set a material and a grating height of each diffraction grating so as to provide high diffraction efficiency over a wide wavelength range. When a light flux enters this diffracting optical element that includes grating surfaces and grating wall surfaces, the incident light flux is reflected on or diffracted by the grating wall surface, causing unnecessary light (flare). Japanese Patent Laid-Open Nos. ("JPs") 2003-240931 and 2004-126394 propose a diffractive optical element that includes an absorption film on the grating wall surface so as to restrain the unnecessary light (flare) on the grating wall surface. JPs 2004-13081 and 2005-62717 adhere two diffraction gratings closely to each other and provide a thin film so as to improve the adhesion property on the interface. JP 2009-217139 discloses a calculation of diffraction efficiency utilizing the rigorous coupled wave analysis ("RCWA").

For the diffractive optical element used for the lens in the optical system, especially problematic and unnecessary light is unnecessary light caused by a total reflection on an interference between a high refractive index medium and a low refractive index medium, of a light flux incident at an obliquely incident angle (off-screen light incident angle) different from a designed incident light flux. However, JPs 2003-240931, 2004-126394, 2004-13081, and 2005-62717 do not care about this problem, or provides an insufficient effect of restraining the unnecessary light.

SUMMARY OF THE INVENTION

Accordingly, the present invention provides a diffractive optical element, an optical system, and an optical apparatus, which can restrain unnecessary light.

A diffractive optical element according to the present invention includes a first diffraction grating and a second diffraction grating which are made of materials different from each other and are stacked in an optical axis direction, and a thin film which is arranged at least part of an interface between the first diffraction grating and the second diffraction grating, includes a single layer or multiple layers made of a material different from that of each of the first and second diffraction gratings, and is transparent to light of a working wavelength range. nd1<nd2 and 0.5<nd3−nd2<0.8 are satisfied, where nd1 is a refractive index of the material of the first diffraction grating to d-line, nd2 is a refractive index of the material of the second diffraction grating to the d-line, and nd3 is a maximum refractive index of the material of one layer of the thin film to the d-line.

Further features of the present invention will become apparent from the following description of exemplary embodiments with reference to the attached drawings.

DESCRIPTION OF THE EMBODIMENTS

A description will be given of embodiments of the present invention with reference to the accompanying drawings:

First Embodiment

Figure 1:
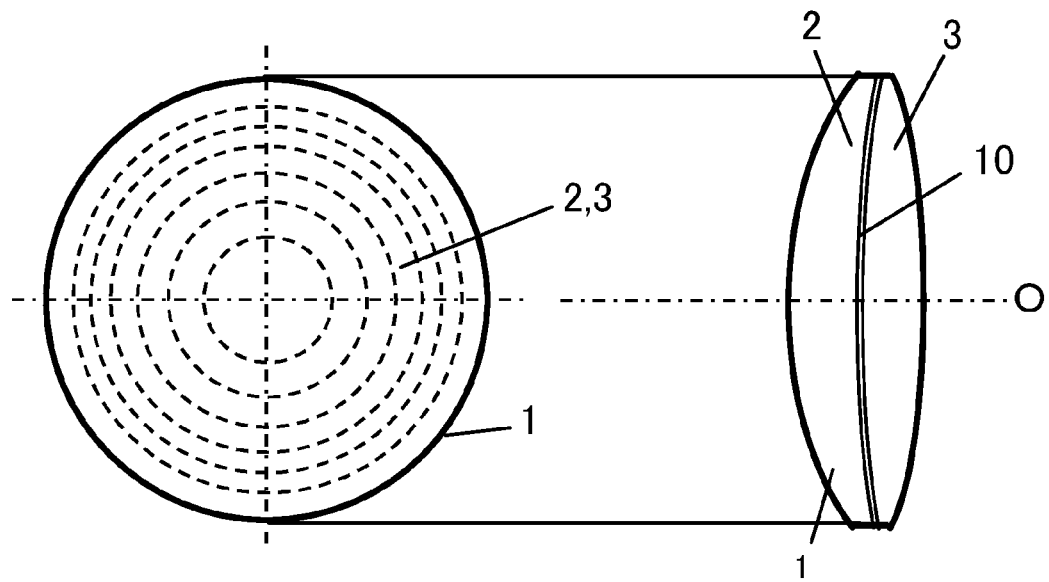
FIG. 1 illustrates a plane view and a side view of a diffractive optical element according to a first embodiment.

FIG. 1 illustrates a plane view and a side view of a diffractive optical element ("DOE") 1 according to a first embodiment. The DOE 1 is configured to improve diffraction efficiency of diffracted light of one specific or designed order in a working wavelength range in an overall visible wavelength range.

The DOE 1 includes a pair of transparent substrates 2 and 3, and a diffraction grating unit 10 arranged between them. While each of the substrates 2 and 3 may have a flat plate shape or a lens serving shape, each of top and bottom surfaces of the substrate 2 and top and bottom surfaces of the substrate 3 has a curved surface in this embodiment.

Figure 2:
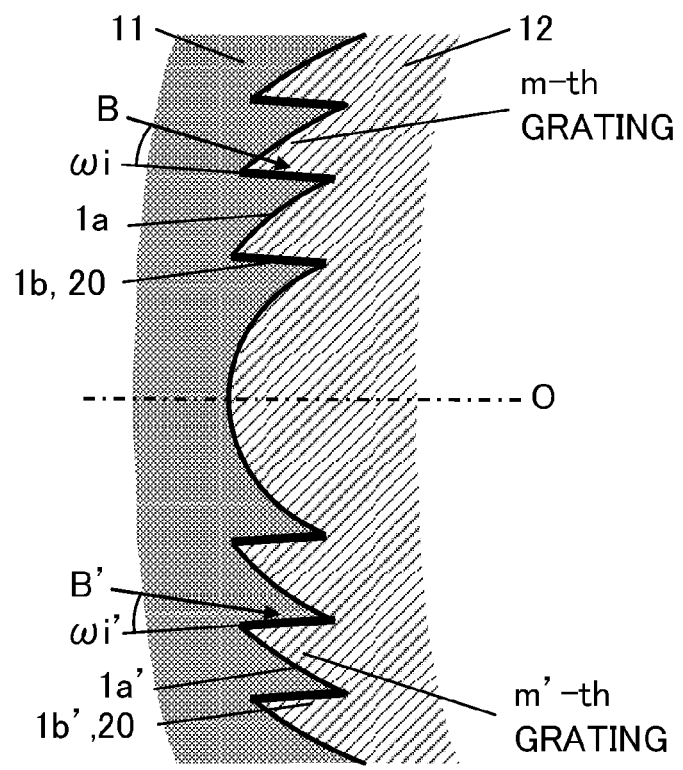
FIG. 2 is a partially enlarged sectional view of FIG. 1 according to the first embodiment.
Figure 3:
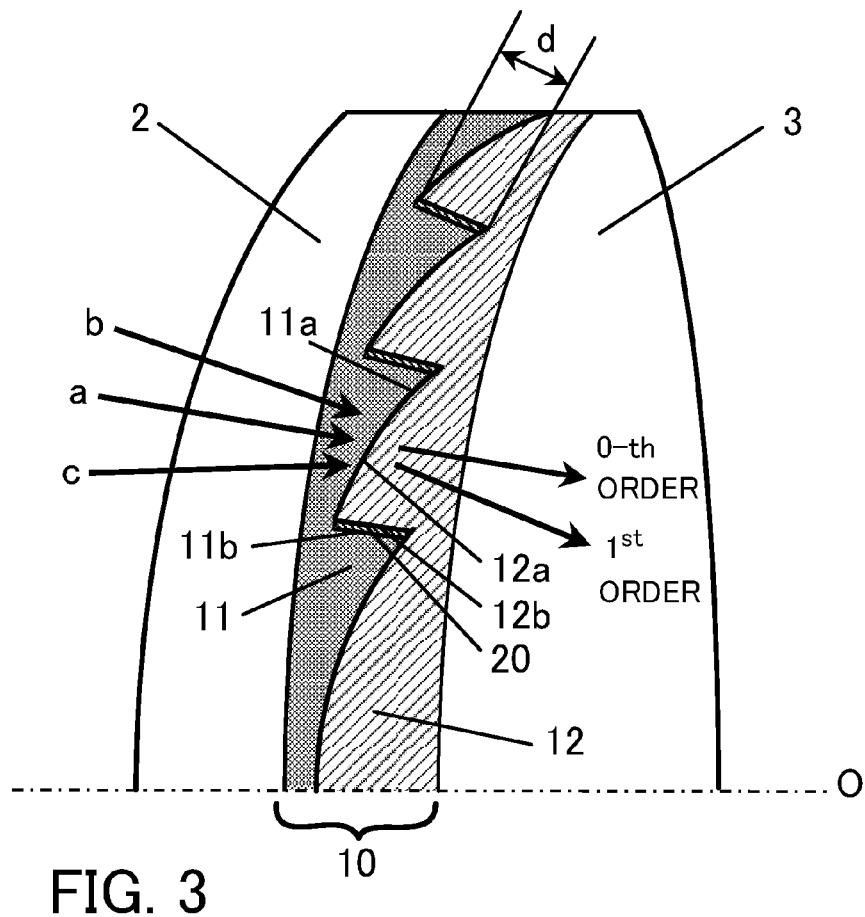
FIG. 3 is a partially enlarged perspective view of the diffraction grating unit illustrated in FIG. 1 according to the first embodiment.
Figure 4:
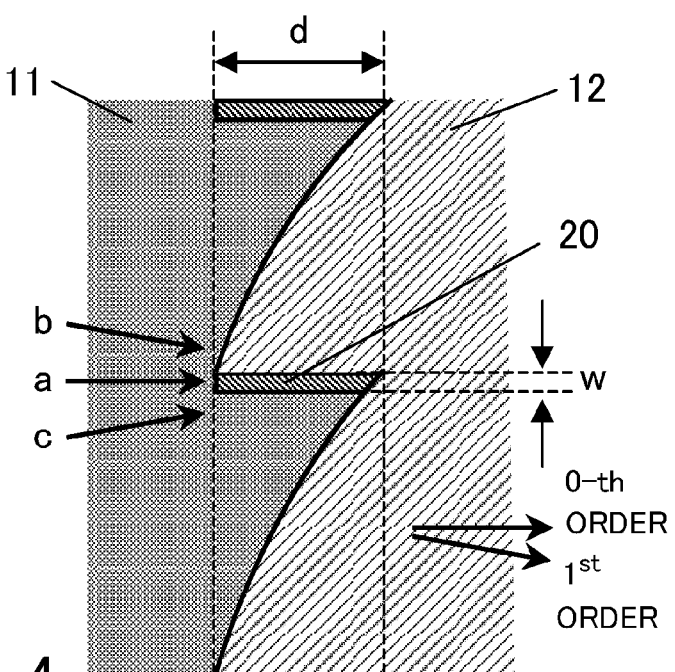
FIG. 4 is a partially enlarged sectional view of FIG. 2 according to the first embodiment.

The diffraction grating unit 10 has a concentrical diffraction grating shape with the optical axis O as a center, and provides a lens operation. FIG. 2 is a partially enlarged sectional view near the center part of FIG. 1. FIG. 3 is a partially enlarged perspective view of the diffraction grating unit 10. FIG. 4 is an enlarged sectional view of FIG. 2.

For better understanding of the grating shape, FIGS. 2 to 4 are exaggeratedly deformed in the grating depth direction, and the number of gratings in these figures is depicted less than the actual number. In FIGS. 3 and 4, an incident light flux "a" is a light flux incident at an incident angle of 0° as a designed incident angle of the DOE 1. An incident light flux "b" is a downwardly incident light flux incident at an obliquely (off-screen) incident angle. An incident light flux "c" is an upwardly incident light flux incident at an oblique (off-screen) incident angle.

In FIGS. 1 and 3, the diffraction grating unit 10 includes a (first) diffraction grating 11 and a (second) diffraction grating 12 that are adhered closely to each other in the optical axis direction, and a thin film 20 that is provided on each grating wall surface between the diffraction gratings 11 and 12 and transparent in the working wavelength range. The diffraction grating 11 and the substrate 2 may be integrated or separate members. The diffraction grating 12 and the substrate 3 may be integrated or separate members.

While the diffraction gratings 11 and 12 are adhered closely to each other in the optical axis direction in this embodiment, the lying thin film 20 may be provided throughout the interface between the diffraction gratings 11 and 12, as discussed later. Therefore, it is sufficient that the diffraction gratings 11 and 12 are stacked in the optical axis directions. There is no space between the diffraction gratings 11 and 12 in this embodiment.

The diffraction grating 11 has a concentric Blazed structure including grating surfaces 11a and grating wall surfaces 11b. The diffraction grating 12 has a concentric Blazed structure including grating surfaces 12a and grating wall surfaces 12b. Each of the diffraction gratings 11 and 12 gradually changes a grating pitch as a position moves from the optical axis O to the outer circumference, thereby realizing a lens serving operation (light converging effect and diverging effect).

The grating surface 11a contacts the grating surface 12a with no spaces, and the grating wall surface 11b contacts the grating wall surface 12b with no spaces. The diffraction gratings 11 and 12 serve as one diffraction grating unit 10 as a whole. The Blazed structure enables the incident light upon the DOE 1 to be diffracted in a specific diffracted order (+1$^{st}$ order in FIGS. 3 and 4) direction to the 0$^{th}$ order diffracted direction that transmits the diffraction grating unit 10 without diffractions.

Since the working wavelength range of the DOE 1 of this embodiment is a visible range, materials and grating heights of the diffraction gratings 11 and 12 are selected so as to provide high diffraction efficiency of the diffracted light of the designed order in the overall visible range. In other words, a material and grating height of each diffraction grating is determined so that a maximum optical path length difference (which is a maximum value of the optical path length difference between a crest and a trough of the diffraction unit) of the light that passes a plurality of diffraction gratings, i.e., the diffraction gratings 11 and 12, can be approximately integer times as large as the wavelength in the working wavelength range. High diffraction efficiency can be obtained in the overall working wavelength range by properly setting the material and shape of the diffraction grating.

In general, the grating height of the diffraction grating is defined as a height between a grating tip and the grating groove in a (grating normal) direction perpendicular to the grating periodic direction. When the grating wall inclines to the grating normal direction or when the grating tip is deformed, etc., it is obtained from an intersection between an extension line of the grating surface and the grating normal. The diffraction grating's material and grating height are not limited.

The diffraction grating 11 is made of fluorine acrylic ultraviolet ("UV") curing resin mixed with ITO nanoparticles (nd=1.504, vd=16.3, θgF=0.390, and n550=1.511). The diffraction grating 12 is made of acrylic UV curing resin mixed with ZrO$_2$ nanoparticles (nd=1.567, vd=47.0, θgF=0.569, and n550=1.570). In each of the diffraction gratings 11 and 12, "nd" is a refractive index to the d-line, "vd" is an Abbe number to the d-line, "θgF" is a partial dispersion ratio between the g-line and the F-line, and n550 is a refractive index to a wavelength of 550 nm.

In this embodiment, the diffraction gratings 11 and 12 are made materials different from each other, and the diffraction grating 11 is made of a low refractive index dispersion material, and the diffraction grating 12 is made of a high refractive index dispersion material having a higher refractive index. However, it is sufficient that one of the refractive index of the material of the diffraction grating 11 to the d-line and the refractive index of the material of the diffraction grating 12 to the d-line is higher.

The resin material in which nanoparticles are dispersed is a UV curing material, and may contain, but is not particularly limited to, acrylic, fluoric, vinyl, or epoxy organic resin. This embodiment sets the designed order to +1$^{st}$ order but the designed order is not limited to +1$^{st}$ order and another designed order can provide a similar effect.

The nanoparticle may contain, but is not limited to, oxide, metal, ceramics, composite, or a mixture thereof. An average particle diameter of the nanoparticle material may be quarter as large as the (working or designed) wavelength of the incident light upon the DOE. A particle diameter larger than this value may increase Rayleigh scattering when the nanoparticle material is mixed with the resin material.

Instead of the resin material in which the nanoparticles are dispersed, an organic material, such as a resin material, a glass material, an optical crystalline material, and a ceramics material may be used.

Control over each annulus may be provided for each annulus of the DOE by changing a width or shape of the thin film. As a result, unnecessary light that would otherwise reach the imaging plane can be effectively restrained.

The thin film 20 has an approximately uniform thickness along the grating wall surface, is configured to reduce unnecessary light that is generated by the oblique (off-screen) incident light flux and would otherwise reach the imaging plane, and is transparent to the light in the working wavelength range of the DOE. The thin film 20 includes a single layer or multiple layers, but the thin film 20 in this embodiment includes a single layer.

The thin film 20 is provided onto at least part of the interference between the diffraction gratings 11 and 12, and onto the grating wall surfaces 1b, 1b' in this embodiment. In FIG. 4, each of the grating wall surfaces 1b, 1b' has a grating height d of 9.29 µm, and the designed order is +1$^{st}$ order.

The thin film 20 is made of a material different from and higher than the material of each of the diffraction gratings 11 and 12, and is made of TiO$_2$ (a refractive index "n" of 2.323 to the d-line) in this embodiment.

When the thin film 20 has a multilayer structure, a material of one layer among the multiple layers may have a maximum refractive index from 1.3 to 2.5 to the d-line. As in the following conditional expressions, the refractive index of the thin film is larger than the larger one of the refractive indexes of the diffraction gratings 11 and 12 by 0.5 or larger and thus may be about 2.0 or larger. The condition of 2.5 or smaller is added to facilitate a selection of a material when the refractive indexes of existing materials are considered.

The thin film 20 has a thickness or width w of 0.1 µm in the direction perpendicular to the grating wall surface as a stacked surface.

A manufacturing method of the thin film 20 is not particularly limited. For example, the diffraction grating 12 is manufactured, and then the thin film 20 is selectively formed. More specifically, a thin film shape is formed using a material of the thin film and the vacuum evaporation, etc., and patterned through the lithography method or nano-imprinting, followed by the selective etching, etc. Alternatively, a forming method can use a mask pattern and a selective evaporation method. Thereafter, the DOE can be manufactured by forming the diffraction grating 11. The thin film 20 can be manufactured by the process, such as evaporation, less expensively and more easily than the absorption film manufacturing method disclosed in JP 2003-240931 and 2004-126394.

Figure 5:
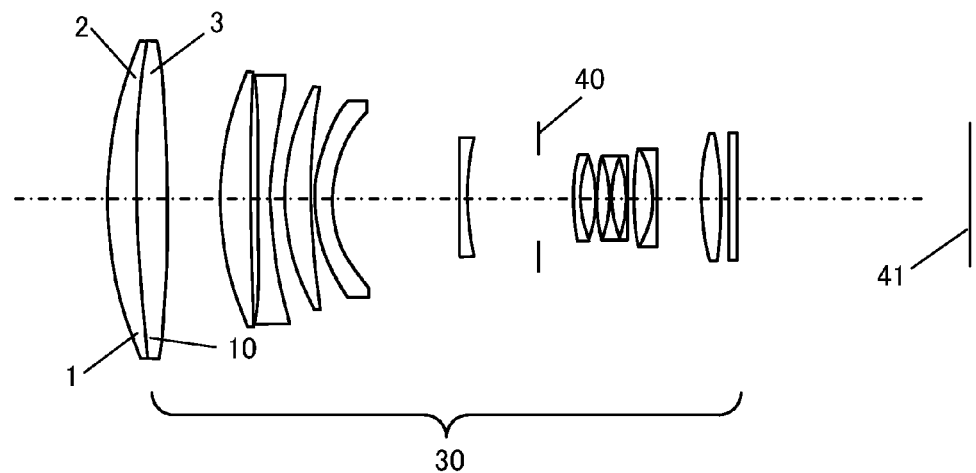
FIG. 5 illustrates an optical path of an optical system having the diffractive optical element illustrated in FIG. 1 according to the first embodiment.
Figure 6:
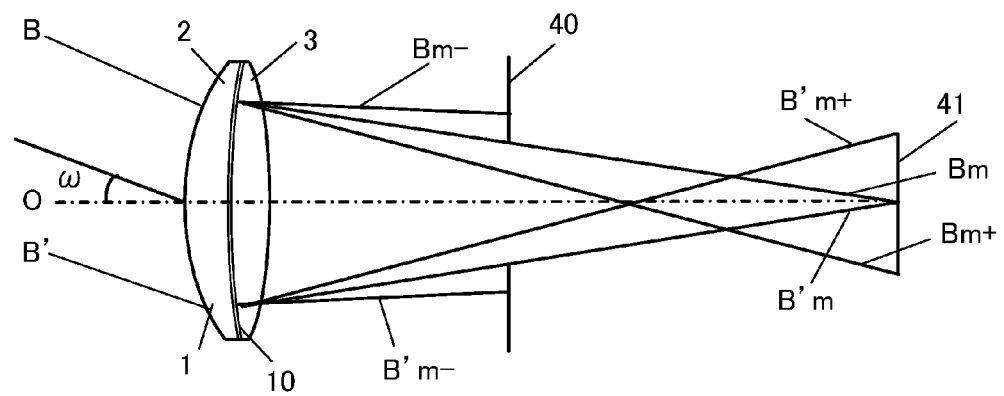
FIG. 6 is a schematic view for explaining influence of unnecessary light in the optical system illustrated in FIG. 5 according to the first embodiment.

FIG. 5 illustrates a telephoto type of image pickup optical system using the DOE 1 and applicable to an image pickup apparatus, such as a camera, where f=392.00 mm, fno=4.12, a half field angle is 3.16, and a diffracting surface is provided on the second surface. FIG. 6 is a schematic view illustrating unnecessary light of the optical system illustrated in FIG. 5.

In FIG. 5, reference numeral 30 denotes an image pickup lens including a stop 40 and the DOE 1. The stop 40 is arranged at the rear side of the DOE 1. Reference numeral 41 denotes an imaging plane on which a film or photoelectric conversion element, such as a CCD and a CMOS, is arranged. A center of gravity (similar to a center of gravity of a diagram) of distributed incident angles of light fluxes incident upon the diffraction grating unit 10 is set so that it can distribute closer to the center of the diffraction grating unit 10 than the grating normal at the center of the diffraction grating of the envelope surface. The diffraction grating unit 10 is provided on, but not limited to, the adhesion surface in the front lens in FIG. 5, and may be provided on a lens surface or a plurality of diffraction grating units 10 may be used in the image pickup lens.

The optical system to which the DOE 1 is applicable is not limited to the image pickup optical system illustrated in FIG. 5, and may be an image pickup lens of a video camera, an imaging optical system used in a wide wavelength range for an imaging scanner and a reader lens in a copier, an observation optical system for a binocular or a telescope, or an optical viewfinder. An apparatus to which the optical system including the DOE 1 is applicable is not limited to the image pickup apparatus, and may be widely applicable to an optical apparatus.

In FIGS. 2 and 6, off-screen light fluxes B and B' incident at an incident angle of ω to the optical axis O pass the substrate 2, and enter the m-th grating and the m'-th grating which are the m-th diffraction gratings from the optical axis O in the upper direction and the lower direction. The incident angle upon the m-th grating of the off-screen light flux B is ωi to the principal ray direction and the incident angle upon the m'-th grating of the off-screen light flux B' is ωi' to the principal ray direction. The grating wall surfaces 1b and 1b' are parallel to the principal ray direction.

Figure 7A:
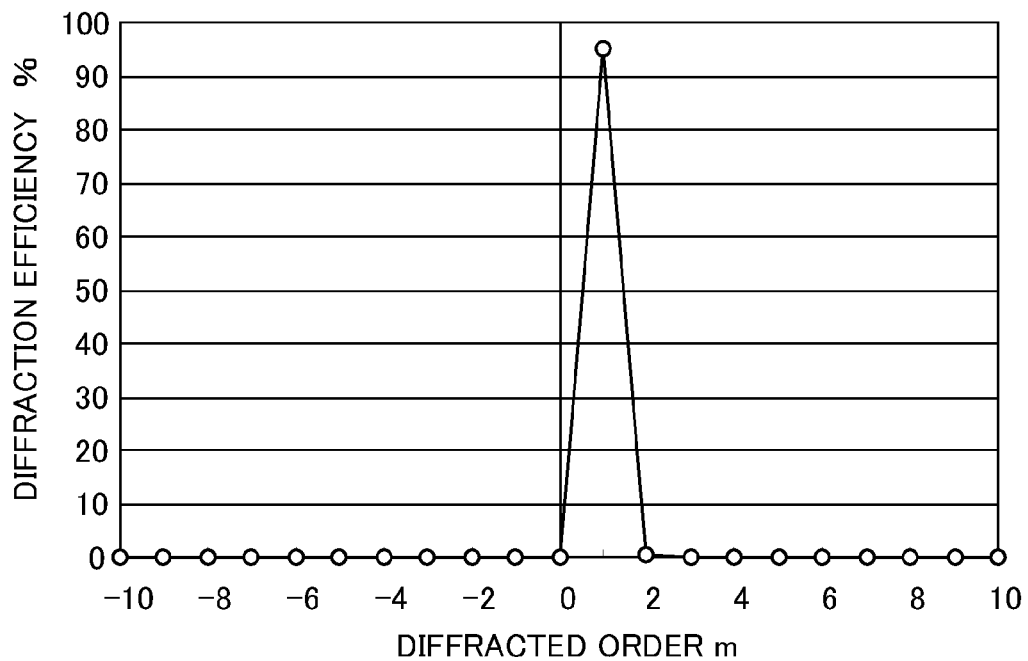
FIGS. 7A and 7B are graphs of the diffraction efficiency of the diffractive optical element illustrated in FIG. 5 to an off-screen light flux having an incident angle of +10° according to the first embodiment.
Figure 7B:
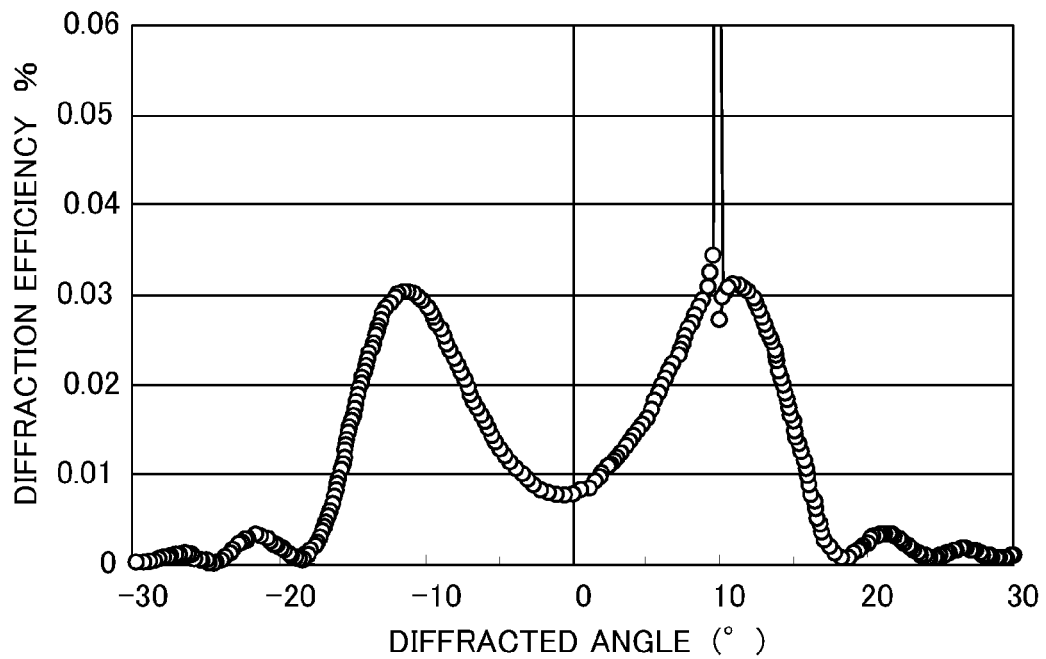

FIGS. 7A and 7B are graphs of RCWA calculation results with an incident angle of +10°, a grating pitch of 100 µm, and a wavelength of 550 nm by supposing the incident light "b" illustrated in FIG. 4 and the incident light "B" illustrated in FIG. 6. The incident angle is set positive in the downward direction in FIG. 4.

FIG. 7A illustrates diffraction efficiency near the +1st order diffracted light as the designed order, where the abscissa axis denotes a diffracted order and the ordinate axis denotes diffraction efficiency. FIG. 7B illustrates a high diffracted angle range by enlarging part of low diffraction efficiency of the ordinate axis of FIG. 7A and by converting the diffracted order of the abscissa axis into a diffracted angle. The diffracted angle is set positive in the downward direction in FIG. 4.

As illustrated in FIG. 7A, the +1$^{st}$ order diffracted light as the designed order provides the highest diffraction efficiency, but this +1$^{st}$ order diffracted light never reaches the image plane and its influence is small. It is understood that the remaining unnecessary light becomes unnecessary light having a peak in the specific angle direction and propagates as illustrated in FIG. 7B.

This unnecessary light has a peak in the approximately −10° direction, and the propagation direction is approximately equal to the exit direction of −10° direction in which an off-screen light flux component having an incident angle of +10° is totally reflected and propagated.

Figure 8A:
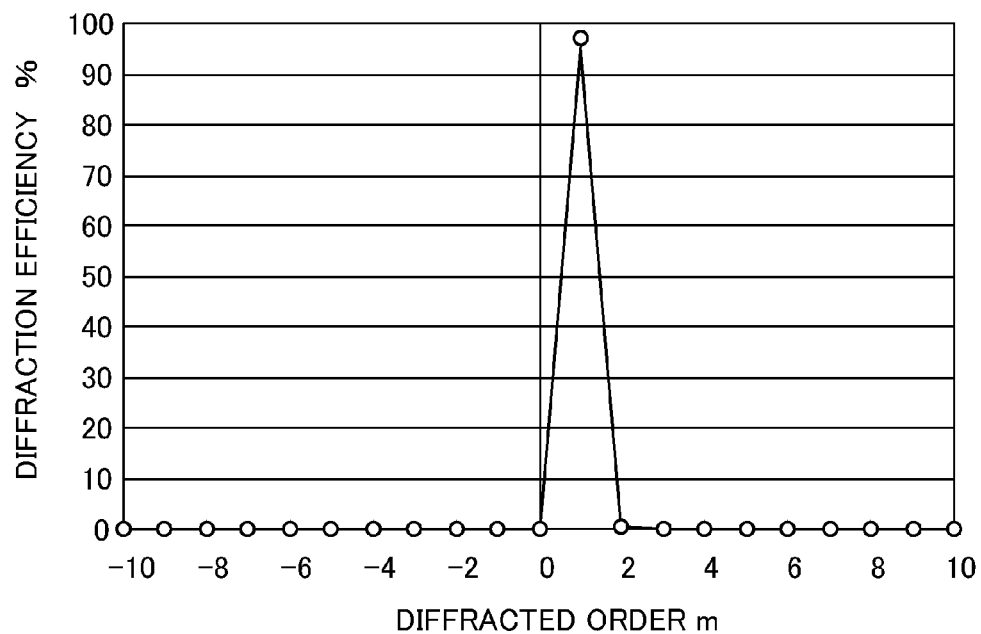
FIGS. 8A and 8B are graphs of a comparative example to FIG. 7.
Figure 8B:
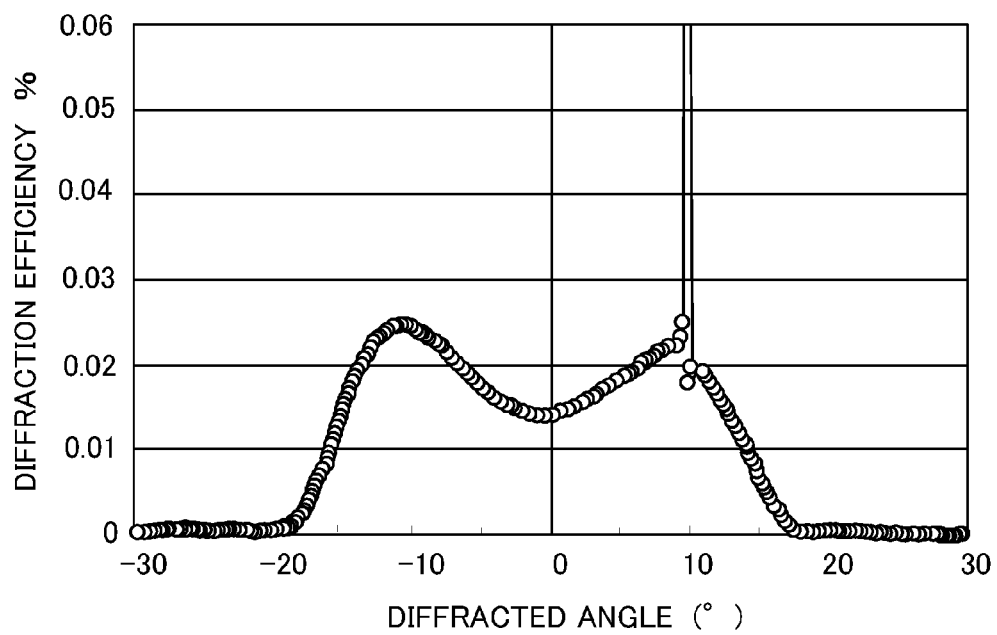

FIGS. 8A and 8B are graphs of a comparative example corresponding to FIGS. 7A and 7B when the DOE of the comparative example is structurally similar to FIG. 1 but does not have the thin film 20.

Figure 9:
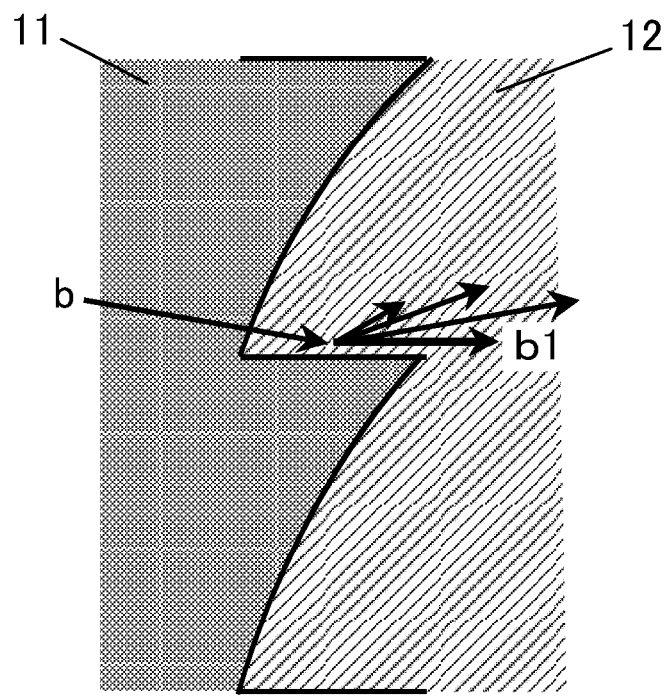
FIG. 9 is a schematic view for explaining a problem of the comparative example illustrated in FIG. 8.

In this comparative example, as illustrated in light fluxes "b1" illustrated in FIG. 9, a light flux "b" incident at an incident angle of +80°, which is larger than a critical angle of 74.2° from the high refractive index material side to the low refractive index material side, upon the grating wall surface is totally reflected on the grating wall surface and unnecessary light spreads from about −10° direction to a high angle range (near the diffracted angle of 0°). Since the diffracted angle of 0° is approximately equal to the diffracted angle of 0.20° (+1$^{st}$ order diffracted light in FIG. 3) of the +1$^{st}$ order diffracted light due to the designed incident angle of 0°, unnecessary light that exits at an angle near the diffracted angle of +0.20° among the unnecessary light derived from the off-screen light having an incident angle of +10° reaches the image plane.

The diffracted order and the diffracted angle of the unnecessary light that is derived from the off-screen incident light and reaches the image plane are different according to an optical system subsequent to the DOE. However, for any optical systems, at least diffracted light of unnecessary light derived from off-screen light reaches the image plane, when the diffracted light has a diffracted angle approximately equal to a diffracted angle at which a designed diffracted order having a designed incident angle is propagated, thereby causing the imaging performance to deteriorate.

A peak angle of unnecessary light in a −10° direction illustrated in FIG. 7B is approximate the same as that of FIG. 8B, but a spread of the unnecessary light is different between FIGS. 7B and 8B and FIG. 7B illustrates lower diffraction efficiency at a low diffracted angle.

In other words, according to this embodiment, a quantity of unnecessary light (such as light fluxes "b1" in FIG. 9) of the low refracted angle is reduced. In the optical system illustrated in FIGS. 5 and 6, at least the diffracted light of the unnecessary light derived from the off-screen light reaches the image plane, when the diffracted light has a diffracted angle approximately equal to the diffracted angle of +0.20° at which the designed diffracted order having the designed incident angle is propagated. From the RCWA calculation result, the diffraction efficiency near the diffracted angle of +0.20° in FIGS. 7A and 7B is 0.0084% for the diffracted order of a −46$^{th}$ order (diffracted angle of +0.34°), and 0.0083% for the diffracted order of a −47$^{th}$ order (diffracted angle of +0.14°).

On the other hand, since the diffraction efficiency of the diffracted order of the comparative example that has no thin film is 0.014% for the diffracted order of a −46$^{th}$ order (diffracted angle of +0.34°), and 0.014% for the diffracted order of a −47$^{th}$ order (diffracted angle of +0.14°). This embodiment thus remarkably reduces the influence of the unnecessary light.

Figure 10:
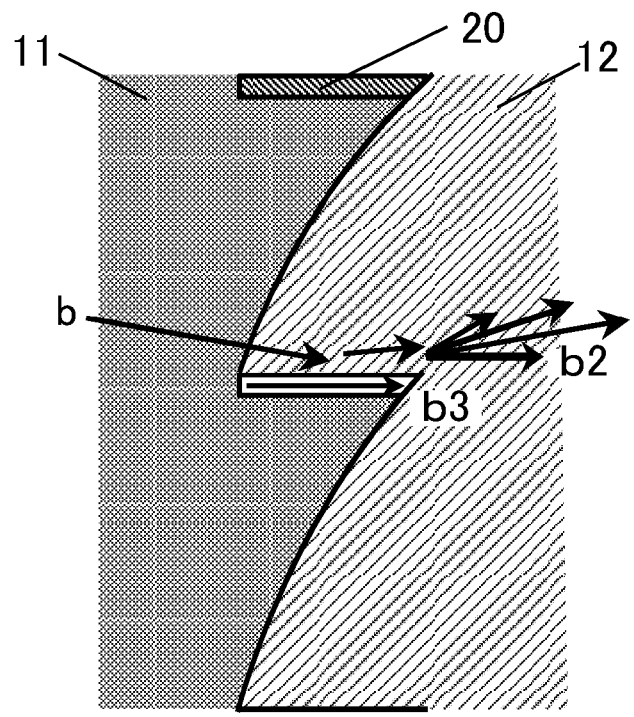
FIG. 10 is a schematic view for explaining an effect of the diffractive optical element illustrated in FIG. 1 according to the first embodiment.

FIG. 10 is a schematic view that corresponds to FIG. 9 in this embodiment. According to this embodiment, unnecessary light derived from part of the light fluxes "b" incident upon the vicinity of the grating wall surface is confined in the thin film 20 and propagates as a light flux b3 like an optical guide wave path. As a result of that these light fluxes interfere with each other after they exit, the light flux reaching the image plane is apparently less than the comparative example.

Next follows the influence of the incident light fluxes "a" and "c" illustrated in FIG. 4.

Figure 11A:
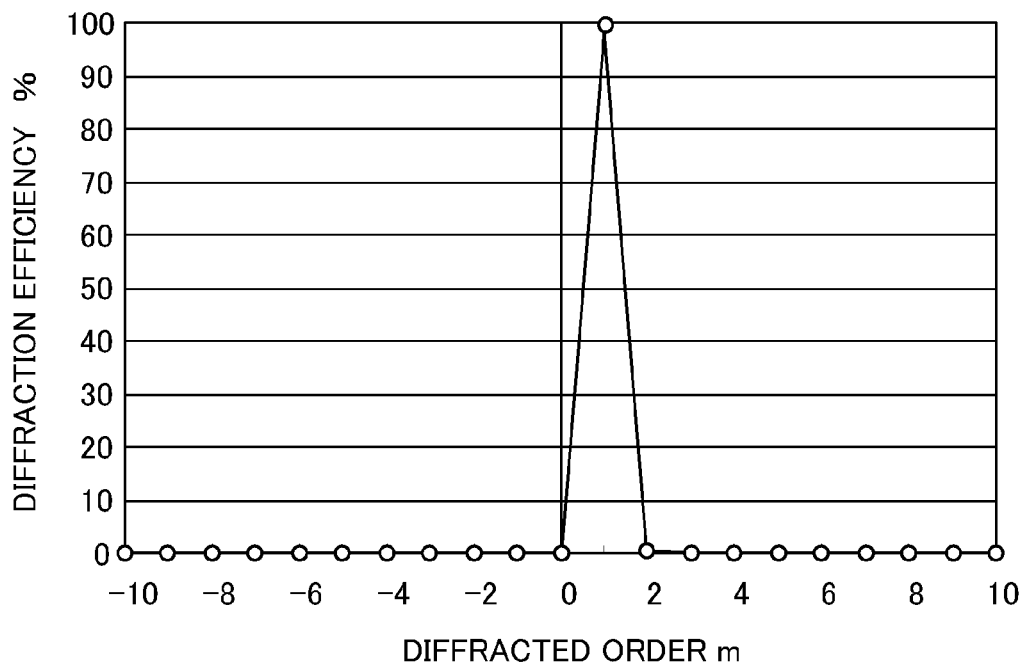
FIGS. 11A and 11B are graphs of diffraction efficiency of the diffractive optical element to a designed incident light flux according to the first embodiment.
Figure 11B:
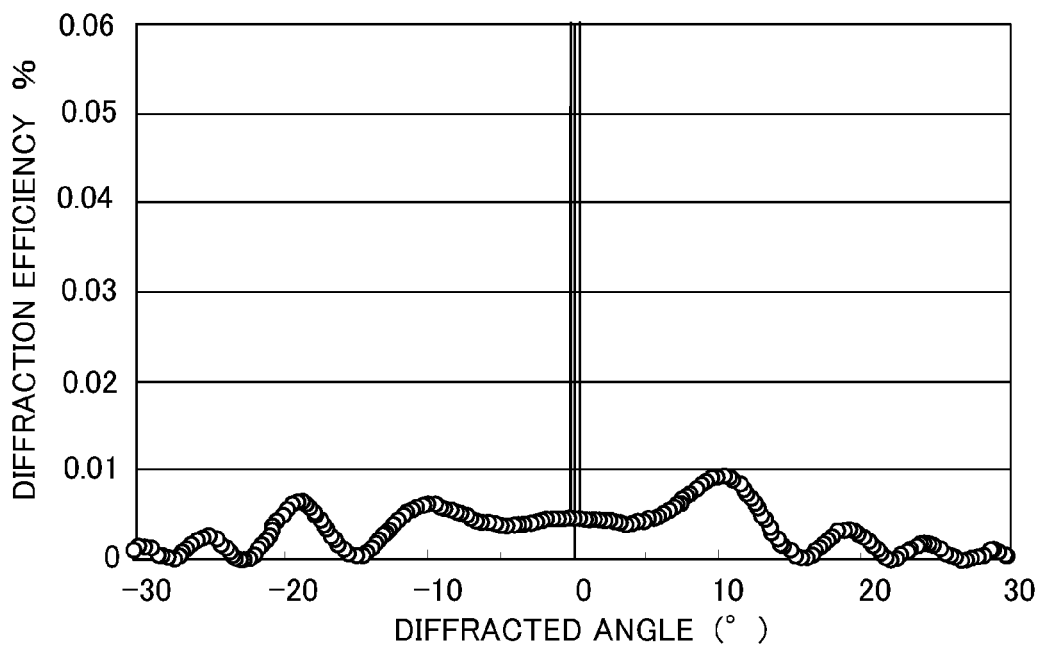

FIGS. 11A and 11B are graphs of RCWA calculation results with an incident angle of 0°, a grating pitch of 100 μm, and a wavelength of 550 nm by supposing the incident light flux "a" illustrated in FIG. 4.

FIG. 11A illustrates diffraction efficiency near the +1st order diffracted light as the designed order, where the abscissa axis denotes a diffracted order and the ordinate axis denotes diffraction efficiency. FIG. 11B illustrates a high diffracted angle range by enlarging part of low diffraction efficiency of the ordinate axis of FIG. 11A, and by converting the diffracted order of the abscissa axis into a diffracted angle. The diffracted angle is set positive in the downward direction in FIG. 4.

Figure 12A:
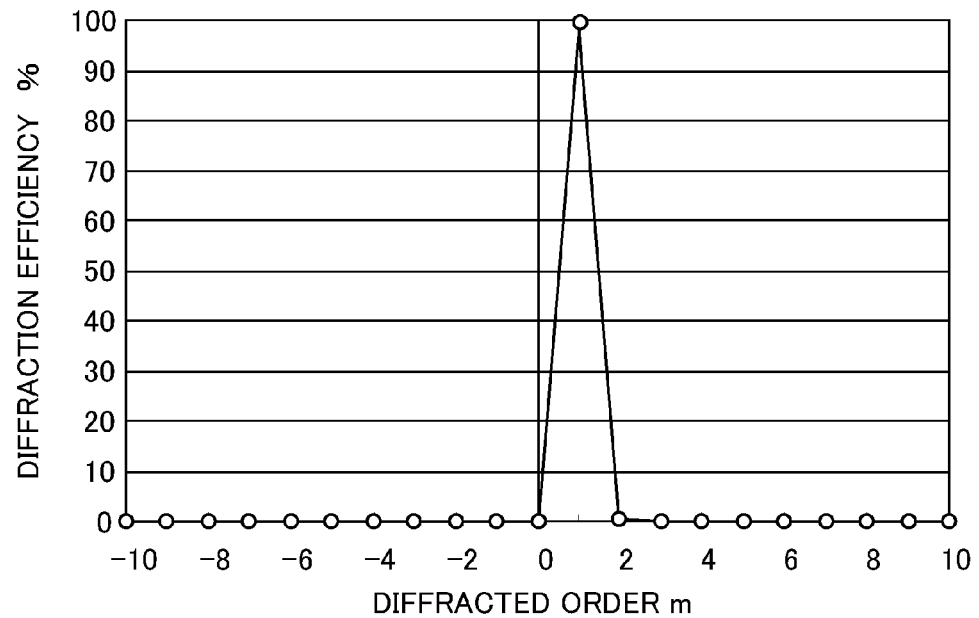
FIGS. 12A and 12B are graphs of diffraction efficiency of the diffractive optical element to the designed incident light flux according to the comparative example.
Figure 12B:
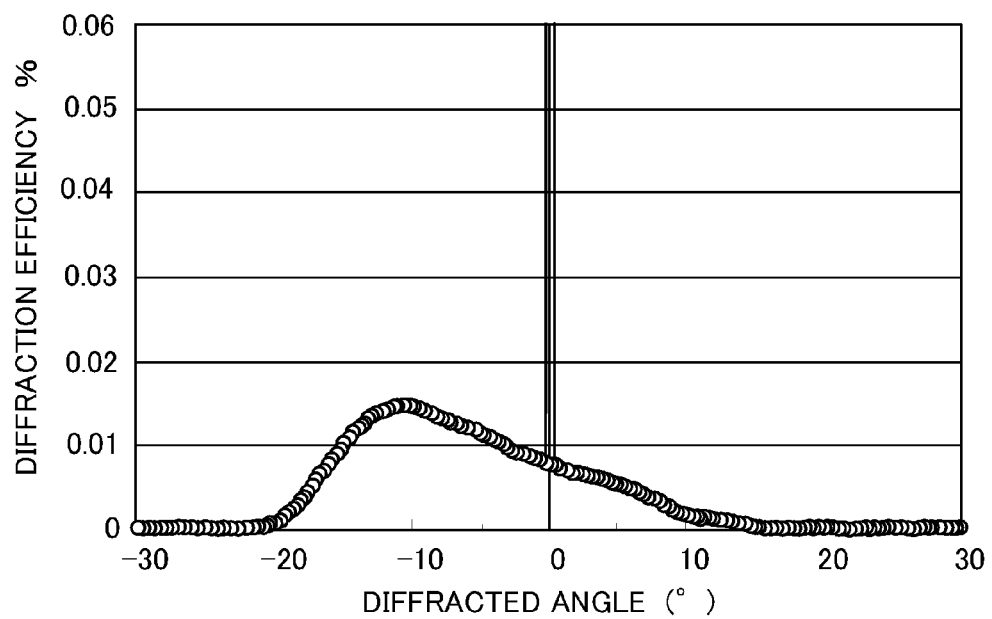

FIGS. 12A and 12B are graphs of a comparative example corresponding to FIGS. 11A and 11B when the DOE is structurally similar to FIG. 1 but does not have the thin film 20.

According to FIG. 11A, the diffraction efficiency of the +1$^{st}$ order diffracted light as the designed order is 99.02% (diffracted angle of +0.20°), as equivalent as or better than the diffraction efficiency of 98.76% (diffracted angle of +0.20°) of the +1$^{st}$ order diffracted light in the diffraction grating having no thin film as illustrated in FIG. 12A. It is understood that the remaining light becomes unnecessary light and propagates as illustrated in FIG. 11B. The supposed grating pitch is 100 μm as one reference. The grating pitch becomes larger as an annulus becomes closer to the optical axis as illustrated in FIG. 1 and the negative influence by the grating wall surface and the reflector decrease. Thus, the diffraction efficiency of the designed order improves and the diffraction efficiency of the unnecessary light becomes lower.

As a result, when the overall DOE region is considered, a difference of the diffraction efficiency of 0.26% with the grating pitch of 100 μm is seldom influential or problematic because it is rare to directly capture a high brightness light source, such as the sun, in daylight at the designed incident angle (the incident angle of the image pickup light). The influence of the unnecessary light is also small.

Figure 13A:
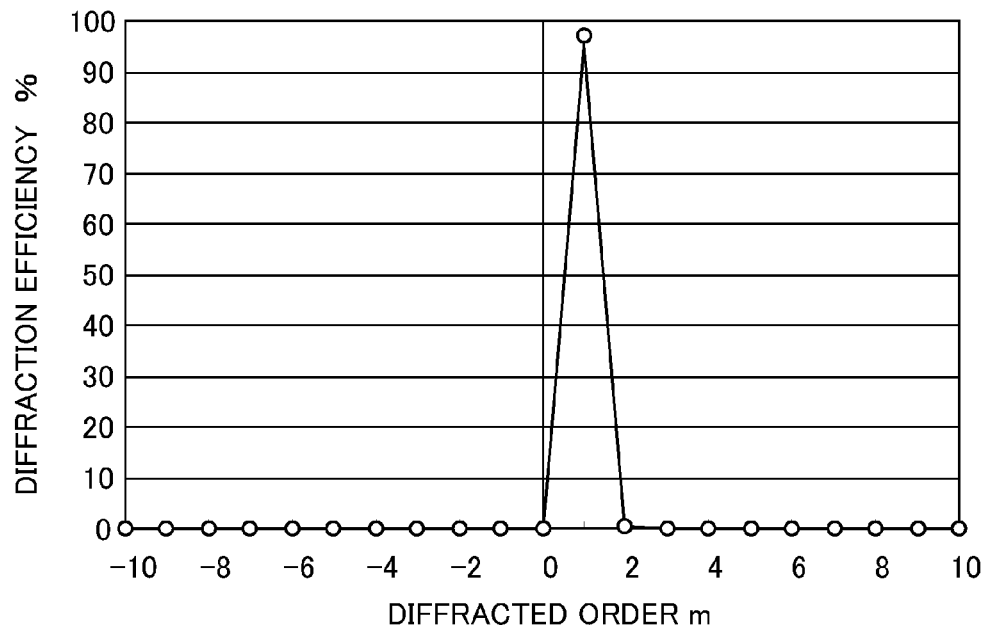
FIGS. 13A and 13B are graphs of diffraction efficiency of the diffractive optical element to an off-screen light flux having an incident angle of −10° according to the first embodiment.
Figure 13B:
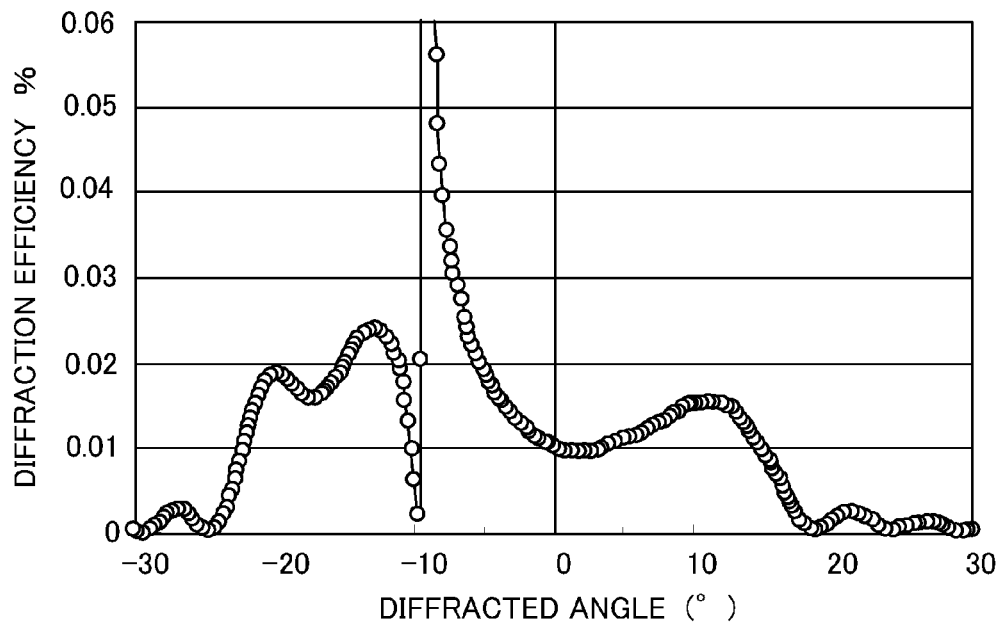

FIGS. 13A and 13B are graphs of RCWA calculation results with an incident angle of −10°, a grating pitch of 100 μm, and a wavelength of 550 nm by supposing the incident light flux "c" illustrated in FIG. 4. The incident angle is set positive in the downward direction in FIG. 4 (or the upper direction of m'-th grating is positive in FIG. 2).

FIG. 13A illustrates diffraction efficiency near the +1$^{st}$ order diffracted light as the designed order, where the abscissa axis denotes a diffracted order and the ordinate axis denotes diffraction efficiency. FIG. 13B illustrates a high diffracted angle range by enlarging part of low diffraction efficiency of the ordinate axis of FIG. 13A and by converting the diffracted order into a diffracted angle of the abscissa axis.

Figure 14A:
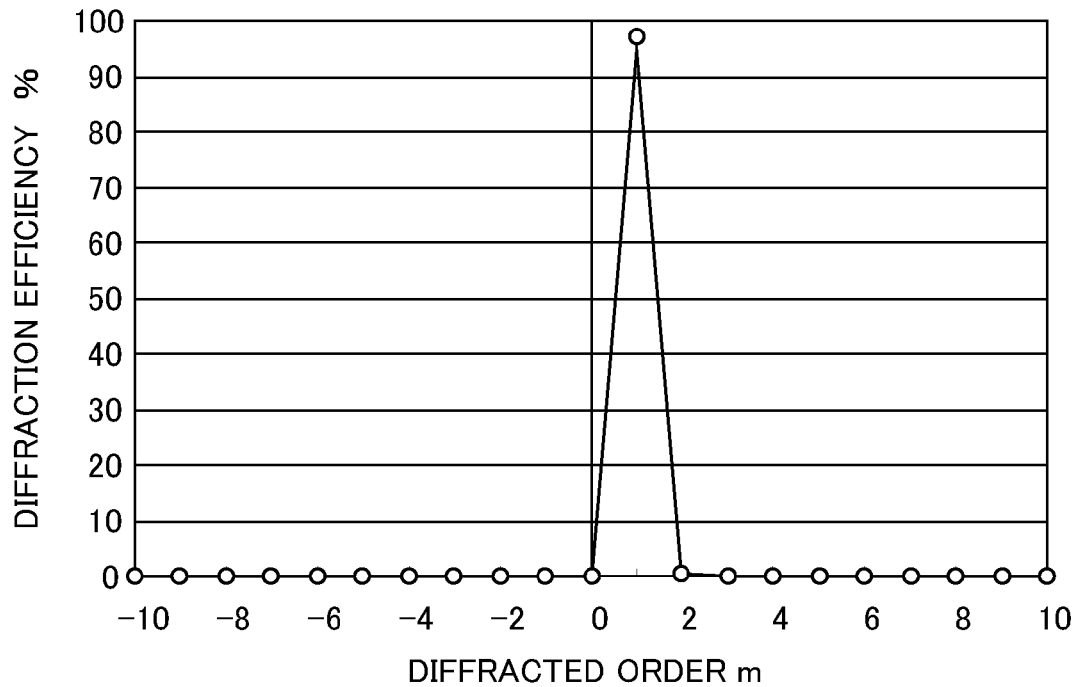
FIGS. 14A and 14B are graphs of diffraction efficiency of the diffractive optical element to an off-screen light flux having an incident angle of −10° according to the comparative example.
Figure 14B:
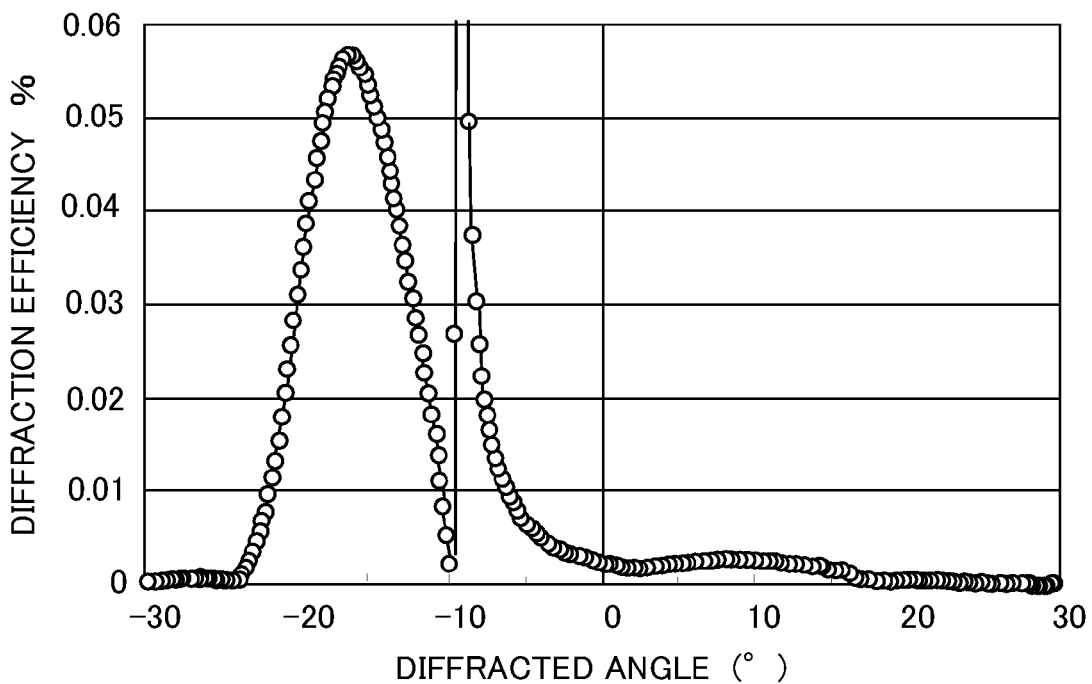

FIGS. 14A and 14B are graphs of a comparative example corresponding to FIGS. 13A and 13B when the DOE of the comparative example is structurally similar to FIG. 1 but does not have the thin film 20.

As illustrated in FIG. 13A, the +1$^{st}$ order diffracted light as the designed order provides the highest diffraction efficiency, but this +1$^{st}$ order diffracted light never reaches the image plane and its influence is small. It is understood that the remaining unnecessary light becomes unnecessary light having a peak in the specific angle direction and propagates as illustrated in FIG. 13B. When FIG. 13B is compared with FIG. 14B, a peak of the unnecessary light in the + direction increases and a peak of the unnecessary light in the − direction decreases. This means that the unnecessary light in the + direction increases because part of the light flux incident upon the grating wall surface from the low refractive index medium side is reflected due to the high refractive index thin film provided on the grating wall surface, and the unnecessary light in the − direction decreases due to transmissions.

In the optical system illustrated in FIGS. 5 and 6, at least the diffracted light of the unnecessary light derived from the off-screen light reaches the image plane, when the diffracted light has a diffracted angle approximately equal to the diffracted angle of +0.20° at which the designed diffracted order having the designed incident angle is propagated. From the RCWA calculation result, the diffraction efficiency near the diffracted angle of +0.20° in FIGS. 13A and 13B is 0.010% for the diffracted order of a $+49^{th}$ order (diffracted angle of $+0.26°$), and 0.010% for the diffracted order of a $+48^{th}$ order (diffracted angle of $+0.06°$). On the other hand, since the diffraction efficiency of the diffracted order of a $+49^{th}$ order (diffracted angle of $+0.26°$) is 0.0021% and the diffraction efficiency of the diffracted order of a $+48^{th}$ order (diffracted angle of $+0.06°$) is 0.0022% in the comparative example as illustrated in FIGS. 14A and 14B. Although this embodiment has higher diffraction efficiencies than those of the comparative example, the values of the diffraction efficiency are extremely small and thus less influential on the deterioration of the imaging performance.

Thus, this embodiment provides a thin film onto the grating wall surface in the optical system to which the DOE of this embodiment is applied, and restrains an increase of the less influential unnecessary light of the m'-th grating down to the non-influential level and remarkably decreases the influential unnecessary light of the m-th grating. As a result, a quantity of unnecessary light that would otherwise reach the imaging plane is reduced and the deterioration of the imaging performance can be restrained. At the same time, the reduction of the diffraction efficiency of the designed order can be restrained to the non-influential level to the imaging performance.

Here, the grating pitch is set to 100 μm. Since a contribution of a wall surface lessens in an annulus having a wide grating pitch, the diffraction efficiency of the designed order improves and the diffraction efficiency of the unnecessary light becomes low. In addition, although not illustrated, the propagation direction of the unnecessary light does not depend upon the grating pitch, and the propagation direction is the same. Therefore, the diffraction efficiency for the grating pitch of 100 μm is illustrated as one reference.

Now it is supposed that an incident angle of each of the off-screen light fluxes B, B' is off-screen $+10°$ and the incident angle ω is $+13.16°$ to the optical axis direction. The influence of the unnecessary light of the DOE is comparatively inconspicuous at an angle smaller than this incident angle because there are increasing ghosts generated on the lens surface and caused by reflections on the imaging plane and scatters inside of the lens and caused by micro roughness on the surface. In addition, the influence of the unnecessary light of the DOE is comparatively small at an angle larger than this incident angle due to reflections on a front lens surface and light shielding by the lens barrel. Hence, the off-screen incident light flux near an incident angle of $+10°$ is most influential on the unnecessary light of the DOE and thus the incident angle of $+10°$ is presumed for the off-screen incident light flux.

This embodiment adheres two diffraction gratings closely to each other, properly sets a material and height of each diffraction grating, and realizes high diffraction efficiency in a wide wavelength range for a predetermined order of diffracted light.

In addition, the DOE 1 according to this embodiment can reduce unnecessary light that would otherwise reach the imaging plane by satisfying the following conditional expression, where nd2 is a refractive index of a material of the diffraction grating 12 to the d-line, and nd3 is a (maximum) refractive index of a material of one layer in the thin film 20 to the d-line.

While this embodiment discusses an example in which nd2 is larger than nd1, which is a refractive index of the material of the diffraction grating 11 to the d-line. However, in case of nd1>nd2, an orientation of the grating shape of the diffraction grating becomes inverted and the influence of the unnecessary light by the grating wall surface behaves similarly. Therefore, the relationship can be generalized as follows:

$$nd1 < nd2$$

$$0.5 < nd3 - nd2 < 0.8 \qquad \text{Expression 1}$$

This embodiment utilizes a reduced propagation of an electromagnetic field from a low refractive index material side to a high refractive index material side of the grating wall surface by a high refractive index thin film provided onto the grating wall surface, and a confinement of part of a light flux in the high refractive index thin film and its propagation like a light guide wave path. When Expression 1 is not satisfied, a refractive index difference becomes small and a reduction effect of the unnecessary light also reduces. In this respect, JP 2004-13081 sets a refractive index difference between the thin film and one of the two optical layers to 0.01 or smaller, and thus cannot provide the effect of this embodiment.

In this embodiment, since the refractive index nd3=2.323, the refractive index nd2=1.567, and the refractive index nd1=1.504, nd3−nd2=0.756 and nd3−nd1=0.819.

In this embodiment, as illustrated in FIG. 6, the stop 40 shields a peak of the unnecessary light but another member may shield the unnecessary light.

Second Embodiment

A second embodiment is similar to the first embodiment but is different from the first embodiment in that a width w of the thin film is 1.0 μm rather than 0.1 μm.

Figure 15:
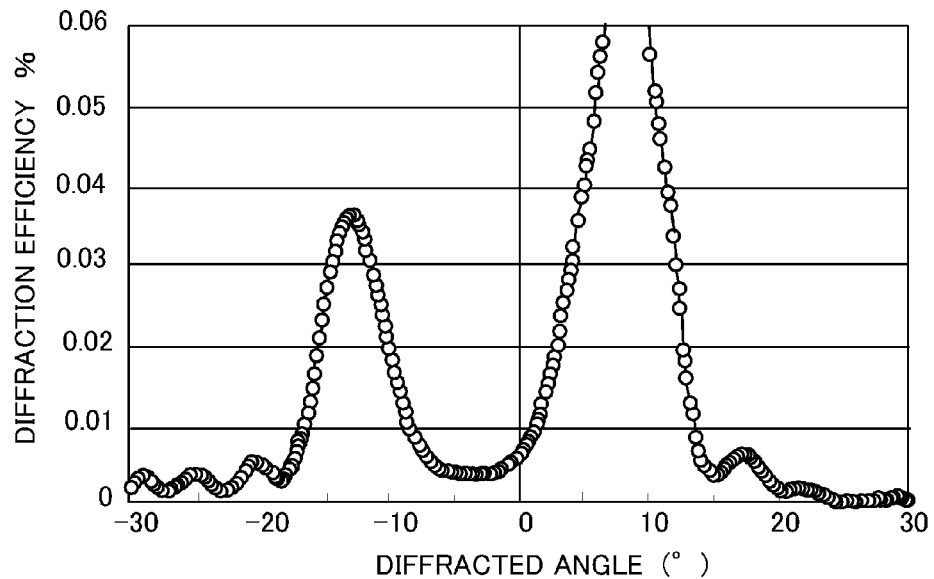
FIG. 15 is a graph of diffraction efficiency of a diffractive optical element to an off-screen light flux having an incident angle of +10° according to the second embodiment.

FIG. 15 is a graph of an RCWA calculation result with an incident angle of $+10°$, a grating pitch of 100 μm, and a wavelength of 550 nm by supposing the incident light flux "b" illustrated in FIG. 4 and the incident light flux "B" illustrated in FIG. 6.

The $+1^{st}$ order diffracted light as the designed order provides the highest diffraction efficiency, but this $+1^{st}$ order diffracted light never reaches the image plane and its influence is small. Similar to the first embodiment, the remaining unnecessary light becomes unnecessary light having a peak in the specific angle direction and propagates.

The peak angle of the unnecessary light in the $-10°$ direction is almost the same as that in FIG. 8B, the spread of the unnecessary light is different between FIG. 15 and FIG. 8B. The diffraction efficiency at the low diffracted angle of FIG. 15 is lower. In other words, a quantity of unnecessary light at the low diffracted angle (the light fluxes "b1" in FIG. 9) is reduced in this embodiment.

In the optical system illustrated in FIGS. 5 and 6, at least the diffracted light of the unnecessary light derived from the off-screen light reaches the image plane, when the diffracted light has a diffracted angle approximately equal to the diffracted angle of $+0.20°$ at which the designed diffracted order having the designed incident angle is propagated. From the RCWA calculation result, the diffraction efficiency near the diffracted angle of $+0.20°$ in FIG. 15 is 0.0065% for the diffraction order of a $-46^{th}$ order, and 0.0074% for the diffraction order of a $-47^{th}$ order.

Figure 16:
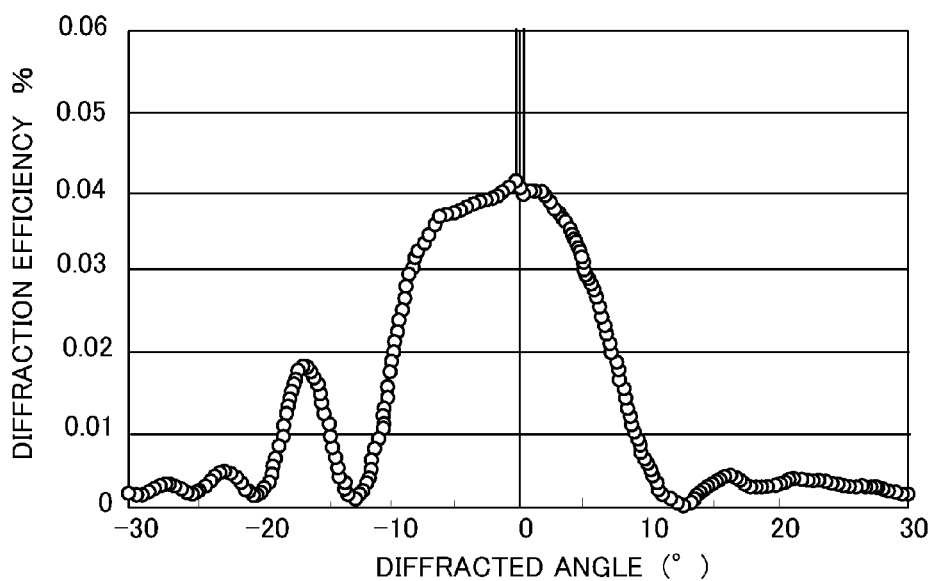
FIG. 16 is a graph of diffraction efficiency of the diffractive optical element to a designed incident light flux according to the second embodiment.

FIG. 16 is a graph of an RCWA calculation result with an incident angle of $0°$, a grating pitch of 100 μm, and a wavelength of 550 nm by supposing the incident light flux "a" illustrated in FIG. 4.

The diffraction efficiency of the $+1^{st}$ order diffracted light as the designed order is 96.06% and lower than that of the diffraction grating that has no thin film. It is understood that the remaining light becomes unnecessary light, and propagates similar to the first embodiment. As a result of that the thin film causes a phase shift, the diffraction efficiency of a comparatively low order (about ±35$^{th}$ orders at diffracted angles ±10°) increases and the diffraction efficiency of the +1$^{st}$ order diffracted light as the designed order decreases. In addition, the thin film is thicker than that in the first embodiment, and thus a reduced amount of the diffraction efficiency of the +1$^{st}$ order diffracted light is larger than that of the first embodiment.

When the overall DOE region is considered, a difference of the diffraction efficiency of 2.70% with this grating pitch of 100 μm is seldom influential because it is rare to directly capture a high brightness light source, such as the sun, in daylight at the designed incident angle (the incident angle of the image pickup light). The influence of the unnecessary light is also small.

Figure 17:
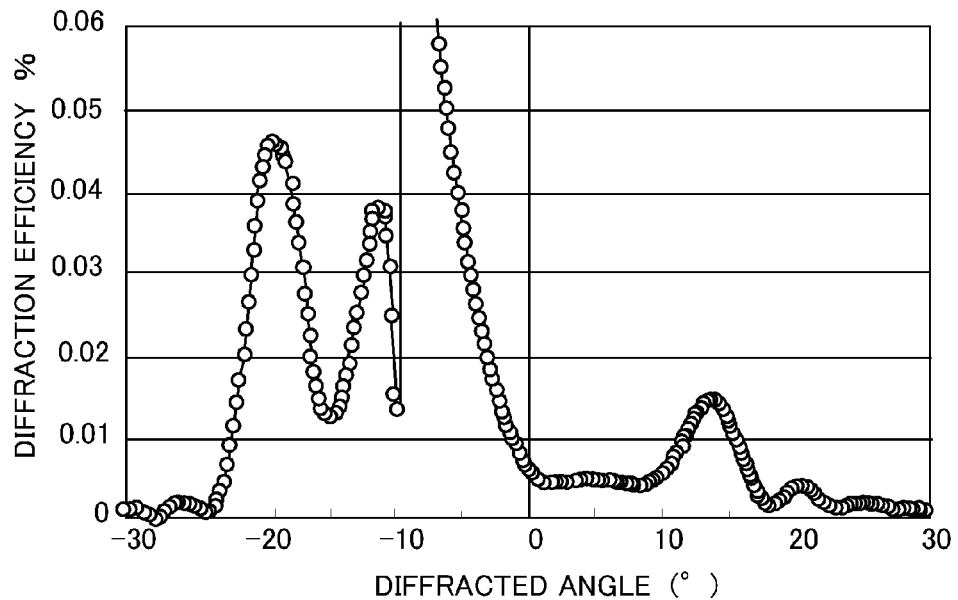
FIG. 17 is a graph of diffraction efficiency of the diffractive optical element to an off-screen light flux having an incident angle of −10° according to the second embodiment.

FIG. 17 is a graph of an RCWA calculation result with an incident angle of −10°, a grating pitch of 100 μm, and a wavelength of 550 nm by supposing the incident light flux "c" illustrated in FIG. 4.

As illustrated in FIG. 17, the +1$^{st}$ order diffracted light as the designed order provides the highest diffraction efficiency, but this +1$^{st}$ order diffracted light never reaches the image plane and its influence is small. Similar to the first embodiment, it is understood that the remaining unnecessary light becomes unnecessary light having a peak in the specific angle direction and propagates. As illustrated in FIGS. 2, 5, and 6, at least the diffracted light of the unnecessary light derived from the off-screen light reaches the image plane, when the diffracted light has a diffracted angle approximately equal to the diffracted angle of +0.20° at which the designed diffracted order at the designed incident angle is propagated. From the RCWA calculation result, the diffraction efficiency near the diffracted angle of +0.20° in FIG. 17 is 0.0060% for the diffracted order of a +49$^{th}$ order, and 0.0064% for the diffraction efficiency of the diffracted order of a +48$^{th}$ order. Although this embodiment has higher diffraction efficiencies than the diffraction grating that has no thin film, the values of the diffraction efficiency are extremely small and less influential on the deterioration of the imaging performance.

Thus, this embodiment provides a thin film to the optical system to which the DOE of this embodiment is applied, and restrains an increase of the less influential unnecessary light of the m'-th grating to the non-influential level and remarkably decreases the influential unnecessary light of the m-th grating. As a result, a quantity of unnecessary light that would otherwise reach the imaging plane is reduced and the deterioration of the imaging performance can be restrained. At the same time, the deterioration of the diffraction efficiency of the designed order can be restrained to the non-influential level on the imaging performance.

Since nd3=2.323, nd2=1.567, and nd1=1.504 are satisfied in this embodiment, nd3−nd2=0.756 and nd3−nd1=0.819, satisfying Expression 1.

Thus, according to this embodiment, the thin film 20 in the optical system to which the DOE 1 is applied reduces unnecessary light that would otherwise reach the imaging plane, prevents the deterioration of the image performance, and restrains the diffraction efficiency of the designed order down to the non-influential level on the imaging performance.

According to this embodiment, the thickness of the thin film 20 is not limited. Nevertheless, as its width becomes thicker, a phase shift region expands between the diffraction gratings 11 and 12, the diffraction efficiency of the unnecessary diffracted light of a comparatively low order increases, and the diffraction efficiency of the designed order (imaging performance) lowers.

Hence, a value made by dividing the total thickness (width) W of the thin film by the grating pitch of the DOE may be larger than 0 and smaller than 0.05 as in the following conditional expression where P is a grating pitch, W is a total thickness in the direction perpendicular to the stacking surface of the thin film 20 (when the thin film includes multiple layers, it is a total thickness of each layer):

$$0<W/P<0.05 \qquad \text{Expression 2}$$

For the diffraction efficiency of the designed order, the width w of the thin film and the grating pitch P have a linear relationship, and the diffraction efficiency of the designed order of the diffraction grating having the grating pitch P and the width w of the thin film 20 is approximately equal to that of the diffraction grating having the grating pitch P×2 and the width w×2 of the thin film 20.

For example, the diffraction efficiency of the designed order of the diffraction grating in the first embodiment having the grating pitch 100 μm and a total width of the thin film of 1.0 μm is approximately equal to that of the diffraction grating having a grating pitch 200 μm and a total width of the thin film of 2.0 μm. Therefore, Expression 2 is established.

As a width of the thin film 20 increases, a quantity of leak light caused by the increased number of propagation modes in the light guide wave path increases and the ripple of unnecessary light increases when a maximum thickness w in a layer having a maximum refractive index in the thin film becomes 2 μm or larger, decreasing the flare reducing effect. Therefore, the thickness w may be less than 2 μm. When the thin film has a multilayer structure, the thickness of the layer having the maximum thickness may be less than 2 μm.

$$0<w<2 \, \mu m \qquad \text{Expression 3}$$

Third Embodiment

A third embodiment is different from the first embodiment in that the thin film 20 is made of $Ta_2O_5$ (n=2.154) and other than that, the third embodiment is similar to the first embodiment.

Figure 18:
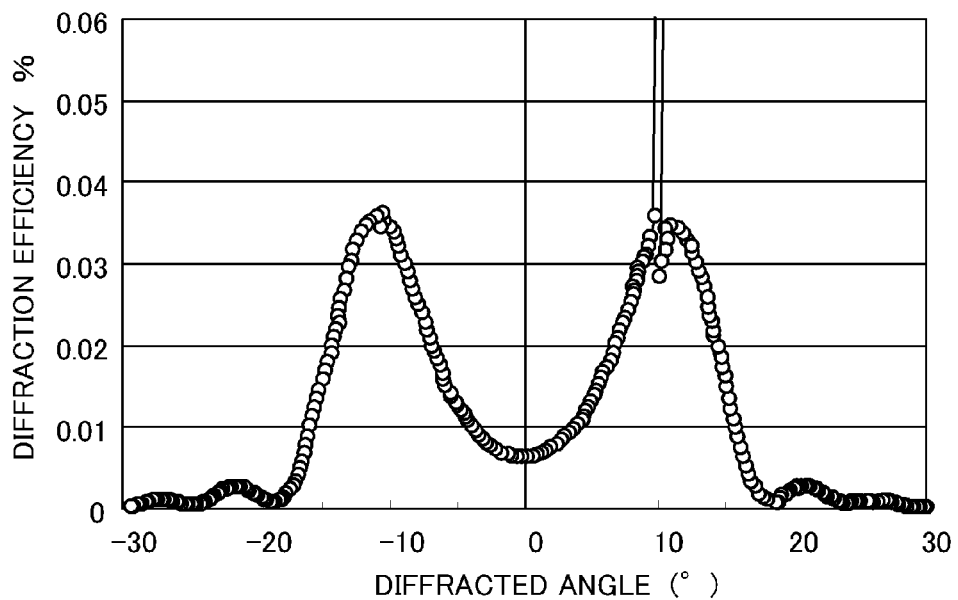
FIG. 18 is a graph of diffraction efficiency of a diffractive optical element to an off-screen light flux having an incident angle of +10° according to a third embodiment.

FIG. 18 is a graph of an RCWA calculation result with an incident angle of +10°, a grating pitch of 100 μm, and a wavelength of 550 nm by supposing the incident light flux "b" illustrated in FIG. 4 and the incident light flux "B" illustrated in FIG. 6.

The +1$^{st}$ order diffracted light as the designed order provides the highest diffraction efficiency, but this +1$^{st}$ order diffracted light never reaches the image plane and its influence is small. Similar to the first embodiment, it is understood that the remaining unnecessary light becomes unnecessary light having a peak in the specific angle direction and propagates.

The peak angle of the unnecessary light in the −10° direction is approximate the same as that of FIG. 8B, but a spread of the unnecessary light is different between FIG. 18 and FIG. 8B and FIG. 18 illustrates lower diffraction efficiency at a low diffracted angle. In other words, a quantity of unnecessary light at the low diffracted angle (the light fluxes "b1" in FIG. 9) is reduced according to this embodiment.

In the optical system illustrated in FIGS. 5 and 6, at least the diffracted light of the unnecessary light derived from the off-screen light reaches the image plane, when the diffracted light has a diffracted angle approximately equal to the diffracted angle of +0.20° at which the designed diffracted order at the designed incident angle is propagated. From the RCWA calculation result, the diffraction efficiency near the diffracted angle of +0.20° in FIG. 18 is 0.0067% for the diffracted order of a $-46^{th}$ order, and 0.0067% for the diffracted order of a $-47^{th}$ order. Thus, similar to FIG. 7B, the diffraction efficiency is remarkably reduced.

Figure 19:
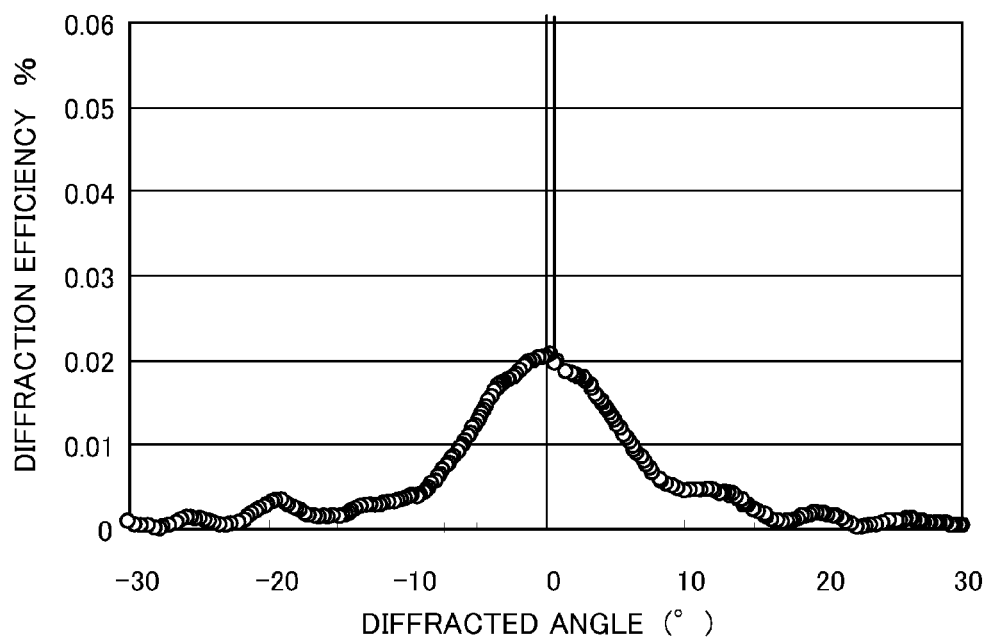
FIG. 19 is a graph of diffraction efficiency of the diffractive optical element to a designed incident light flux according to the third embodiment.

FIG. 19 is a graph of an RCWA calculation result with an incident angle of 0°, a grating pitch of 100 μm, and a wavelength of 550 nm by supposing the incident light flux "a" illustrated in FIG. 4.

The diffraction efficiency of the $+1^{st}$ order diffracted light as the designed order is 98.39% and lower than that of the diffraction grating that has no thin film. The remaining light becomes unnecessary light, and propagates similar to the first embodiment. As a result of that this thin film causes a phase shift, the diffraction efficiency of a comparatively low order (about $\pm 35^{th}$ orders at diffracted angles ±10°) increases and the diffraction efficiency of the $+1^{st}$ order diffracted light as the designed order decreases.

When the overall DOE region is considered, a reduced amount of the diffraction efficiency by 0.37% with this grating pitch of 100 μm is seldom influential or problematic because it is rare to directly capture a high brightness light source, such as the sun, in daylight at the designed incident angle (the incident angle of the image pickup light). The influence of the unnecessary light is also small.

Figure 20:
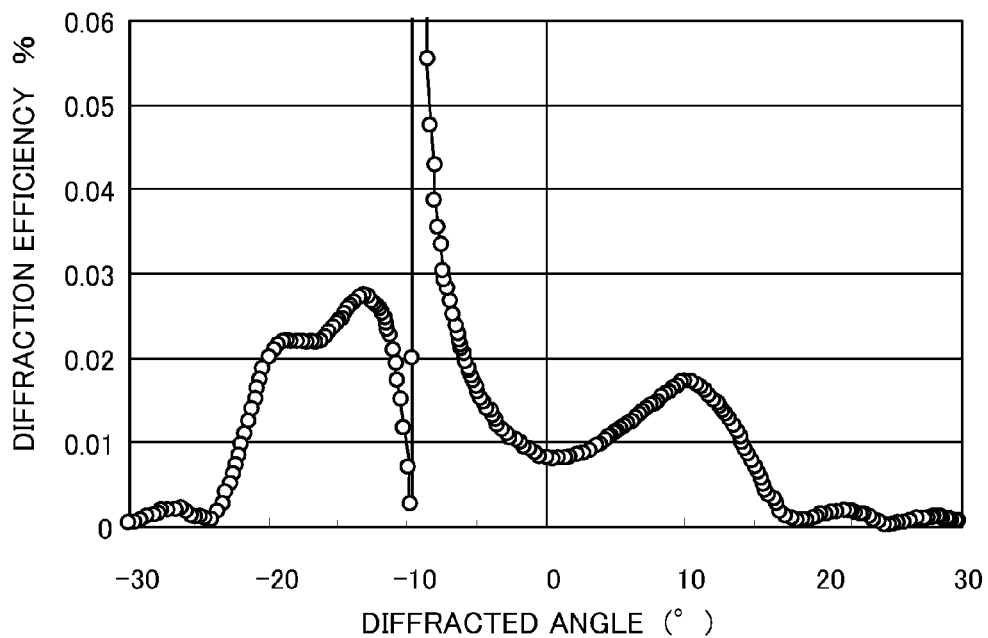
FIG. 20 is a graph of diffraction efficiency of the diffractive optical element to an off-screen light flux having an incident angle of −10° according to the third embodiment.

FIG. 20 is a graph of an RCWA calculation result with an incident angle of −10°, a grating pitch of 100 μm, and a wavelength of 550 nm by supposing the incident light flux "c" illustrated in FIG. 4.

As illustrated in FIG. 20, the $+1^{st}$ order diffracted light as the designed order provides the highest diffraction efficiency, but this +1st order diffracted light never reaches the image plane and its influence is small. Similar to the first embodiment, it is understood that the remaining unnecessary light becomes unnecessary light having a peak in the specific angle direction and propagates. As illustrated in FIGS. 2, 5, and 6, at least the diffracted light of the unnecessary light derived from the off-screen light reaches the image plane, when the diffracted light has a diffracted angle approximately equal to the diffracted angle of +0.20° at which the designed diffracted order at the designed incident angle is propagated. From the RCWA calculation result, the diffraction efficiency near the diffracted angle of +0.20° in FIG. 20 is 0.0084% for the diffracted order of a $+49^{th}$ order, and 0.0084% for the diffracted order of a $+48^{th}$ order. Although this embodiment has higher diffraction efficiencies than the diffraction grating that has no thin film, the values of the diffraction efficiency are extremely small and less influential on the deterioration of the imaging performance.

Thus, this embodiment provides a thin film to the optical system to which the DOE of this embodiment is applied, and restrains an increase of the less influential unnecessary light of the m'-th grating to the non-influential level and remarkably decreases the influential unnecessary light of the m-th grating. As a result, a quantity of unnecessary light that would otherwise reach the imaging plane is reduced and the deterioration of the imaging performance can be restrained. At the same time, the reduction of the diffraction efficiency of the designed order can be restrained to the non-influential level on the imaging performance.

Since nd3=2.154, nd2=1.567, and nd1=1.504 are satisfied in this embodiment, nd3−nd2=0.587 and nd3−nd1=0.650. Thus, this embodiment satisfies Expression 1.

Thus, the thin film 20 in the optical system of this embodiment can reduce the unnecessary light that would otherwise reach the imaging plane, prevent the drop of the image performance, and restrain the diffraction efficiency of the designed order down to the non-influential level on the imaging performance.

Fourth Embodiment

Figure 21:
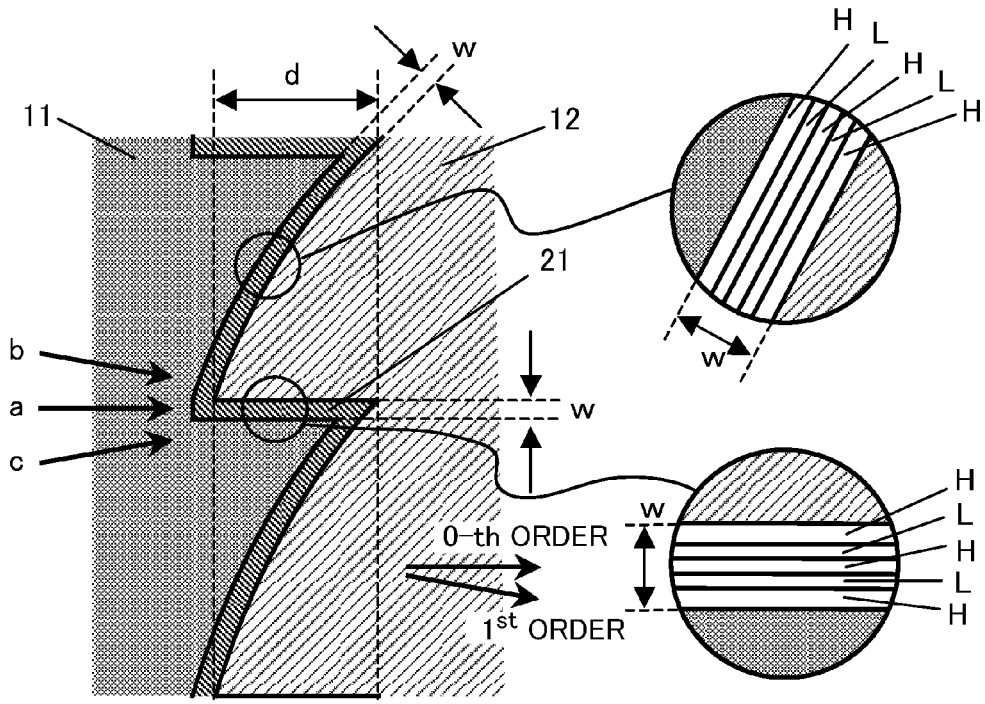
FIG. 21 is a partially enlarged sectional view of a diffractive optical element according to a fourth embodiment.

A fourth embodiment is an embodiment that provides a thin film onto the overall interface rather than only onto a grating wall surface (so that a thin film 21 can be continuously provided from the grating wall surface to the grating surface). FIG. 21 is an enlarged sectional view of a diffraction grating of the fourth embodiment. For better understanding, FIG. 21 is exaggeratedly deformed in the grating periodic direction. The diffraction gratings 11 and 12 are structurally the same as those of the first embodiment.

A transparent thin film 21 is provided on the overall interface between the diffraction gratings 11 and 12, and the thin film 21 has an approximately uniform thickness over the overall region of the grating wall surface from the grating surface. The thin film 21 is configured to provide an antireflection function to a perpendicularly (on-screen) incident light flux incident upon the grating surface, and to reduce a quantity of unnecessary light generated by an obliquely (off-screen) incident light flux that would otherwise reach the imaging plane.

The thin film 21 is a multilayer film that includes 15H, 27L, 120H, 28L, and 15H in order from the diffraction grating 11 to the diffraction grating 12. Here, "H" denotes a high refractive index layer ($TiO_2$ layer), "L" denotes a low refractive index layer ($SiO_2$ layer (n=1.482)), and a numerical value denotes a physical film thickness (nm). In the 5-layer thin film, one high refractive index thin film is designed physically thicker than another layer. For (an incident light flux "a" having) an incident angle of 0° as the designed incident angle on the grating surface of the DOE, it is designed so that the transmittance of the overall visible range (430 nm to 670 nm) can be 99.7% or higher.

Figure 22:
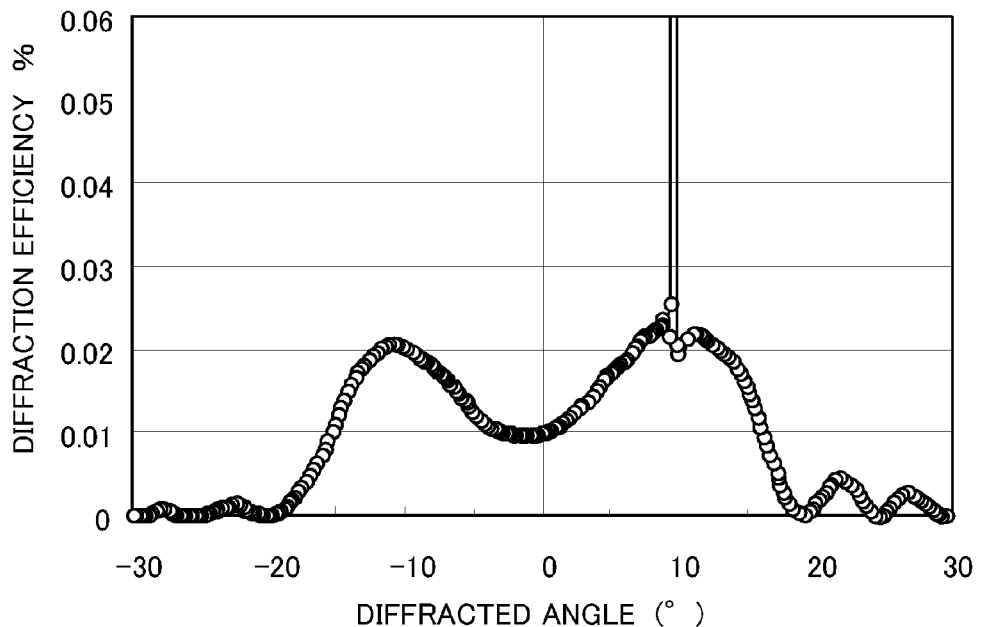
FIG. 22 is a graph of diffraction efficiency of the diffractive optical element illustrated in FIG. 21 to an off-screen light flux having an incident angle of +10° according to the fourth embodiment.

FIG. 22 is a graph of an RCWA calculation result with an incident angle of +10°, a grating pitch of 100 μm, and a wavelength of 550 nm for the incident light flux "b" in FIG. 21 and the incident light flux "B" illustrated in FIG. 6.

The $+1^{st}$ order diffracted light as the designed order provides the highest diffraction efficiency, but this $+1^{st}$ order diffracted light never reaches the image plane and its influence is small. Similar to the first embodiment, it is understood that the remaining unnecessary light becomes unnecessary light having a peak in the specific angle direction and propagates.

The peak angle of the unnecessary light in the −10° direction is approximate the same as that of FIG. 8B, but a spread of the unnecessary light is different between FIG. 22 and FIG. 8B and FIG. 22 illustrates lower diffraction efficiency at a low diffracted angle. In other words, a quantity of unnecessary light at the low diffracted angle (the light fluxes "b1" in FIG. 9) is reduced according to this embodiment.

In the optical system illustrated in FIGS. 5 and 6, at least the diffracted light of the unnecessary light derived from the off-screen light reaches the image plane, when the diffracted light has a diffracted angle approximately equal to the diffracted angle of +0.20° at which the designed diffracted order at the designed incident angle is propagated. From the RCWA calculation result, the diffraction efficiency near the diffracted angle of +0.20° in FIG. 22 is 0.010% for the diffracted order of a $-46^{th}$ order, and 0.010% for the diffracted order of a $-47^{th}$ order. Thus, similar to FIG. 7B, the diffraction efficiency is remarkably reduced.

Figure 23:
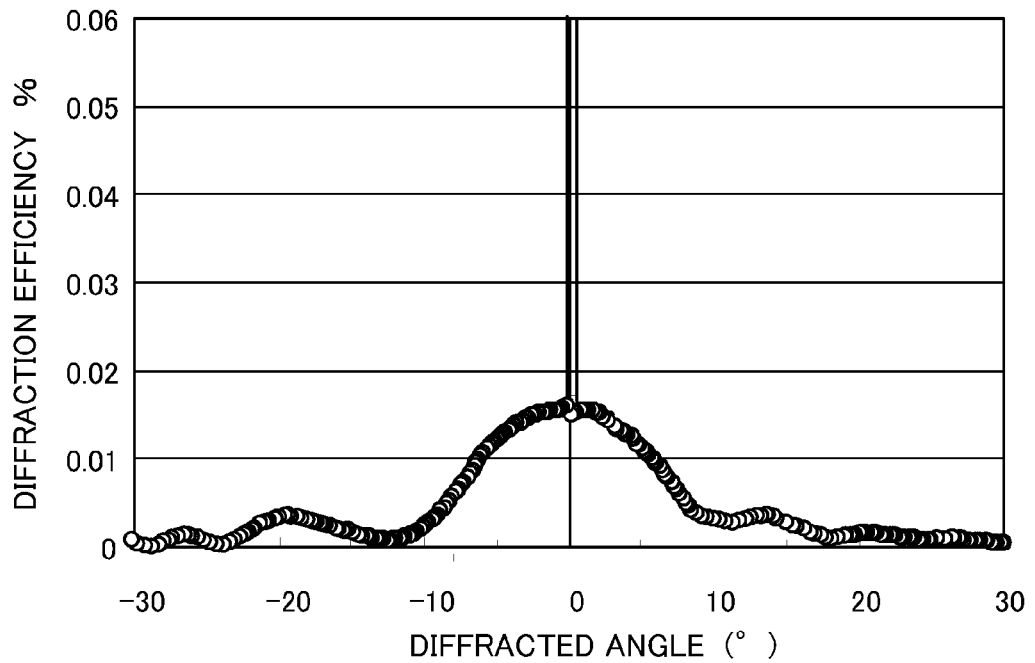
FIG. 23 is a graph of diffraction efficiency of the diffractive optical element to a designed incident light flux according to the fourth embodiment.

FIG. 23 is a graph of an RCWA calculation result with an incident angle of 0°, a grating pitch of 100 μm, and a wavelength of 550 nm by supposing the incident light flux "a" illustrated in FIG. 4.

The diffraction efficiency of the $+1^{st}$ order diffracted light as the designed order is 98.61% and lower than that of the diffraction grating that has no thin film. The remaining light becomes unnecessary light, and propagates similar to the first embodiment. As a result of that this thin film causes a phase shift, the diffraction efficiency of a comparatively low order (about $\pm 35^{th}$ orders at diffracted angles $\pm 10°$) increases and the diffraction efficiency of the $+1^{st}$ order diffracted light as the designed order decreases.

When the overall DOE region is considered, a reduced amount of the diffraction efficiency by 0.15% with this grating pitch of 100 μm is seldom influential or problematic because it is rare to directly capture a high brightness light source, such as the sun, in daylight at the designed incident angle (the incident angle of the image pickup light). The influence of the unnecessary light is also small.

Figure 24:
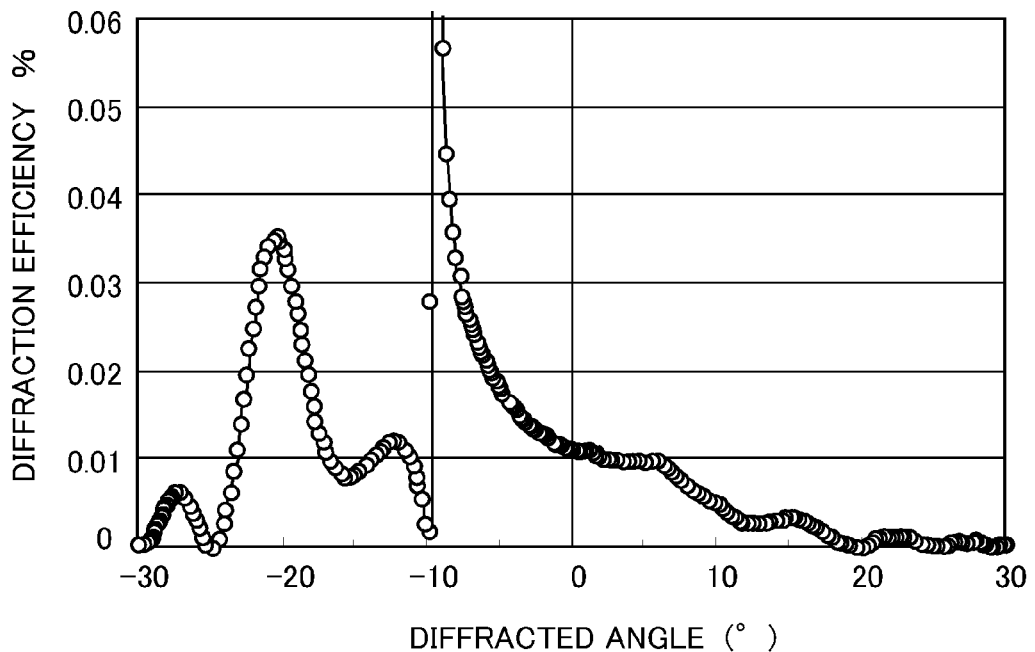
FIG. 24 is a graph of diffraction efficiency of the diffractive optical element to an off-screen light flux having an incident angle of −10° according to the fourth embodiment.

FIG. 24 is a graph of an RCWA calculation result with an incident angle of $-10°$, a grating pitch of 100 μm, and a wavelength of 550 nm by supposing the incident light flux "c" illustrated in FIG. 4.

As illustrated in FIG. 24, the $+1^{st}$ order diffracted light as the designed order provides the highest diffraction efficiency, but this $+1^{st}$ order diffracted light never reaches the image plane and its influence is small. Similar to the first embodiment, it is understood that the remaining unnecessary light becomes unnecessary light having a peak in the specific angle direction and propagates. As illustrated in FIGS. 2, 5, and 6, at least the diffracted light of the unnecessary light of the off-screen light reaches the image plane, when the diffracted light has a diffracted angle approximately equal to the diffracted angle of $+0.20°$ at which the designed diffracted order at the designed incident angle is propagated. From the RCWA calculation result, the diffraction efficiency near the diffracted angle of $+0.20°$ in FIG. 24 is 0.011% for the diffracted order of a $+49^{th}$ order, and 0.011% for the diffracted order of a $+48^{th}$ order. Although this embodiment has higher diffraction efficiencies than the diffraction grating that has no thin film, the values of the diffraction efficiency are extremely small and less influential on the deterioration of the imaging performance.

Thus, this embodiment provides a thin film to the optical system to which the DOE of this embodiment is applied, and restrains an increase of the less influential unnecessary light of the m'-th grating to the non-influential level and remarkably decreases the influential unnecessary light of the m-th grating. As a result, a quantity of unnecessary light that would otherwise reach the imaging plane is reduced and the deterioration of the imaging performance can be restrained. At the same time, the reduction of the diffraction efficiency of the designed order can be restrained to the non-influential level on the imaging performance.

The thin film 21 of this embodiment has a five-layer structure but the number of layers, the film thickness, and the film material are not limited, and a thin film having a single film structure may be adopted as illustrated in the first to third embodiments. When the film structure is designed, the antireflection characteristic on the grating surface and the unnecessary light restraining effect on the grating wall surface can be arbitrarily provided by selecting materials for the diffraction gratings 11 and 12. In the multilayer thin film, a layer made of a high refractive index material is made optically thickest so as to provide a light guide wave path structure.

While the first to third embodiments provide a single-layer thin film on each grating wall surface, a multilayer thin film may be provided on the grating wall surface. Even in this case, in the multilayer thin film, the layer made of the high refractive index material is made optically thickest so as to provide the light guide wave path structure.

This embodiment provides a thin film on the overall interface, and thus can more easily and less expensively manufacture the DOE than the first to third embodiments. For example, a DOE manufacturing method may include, but is not limited to, forming a thin film onto an overall region from the grating surface to the grating wall surface by the vacuum evaporation etc. after the diffraction grating 12 is manufactured, and then forming the diffraction grating 11. A thin film provided on the overall interface can enhance the adhesion property between the diffraction gratings 11 and 12.

Fifth Embodiment

Figure 25:
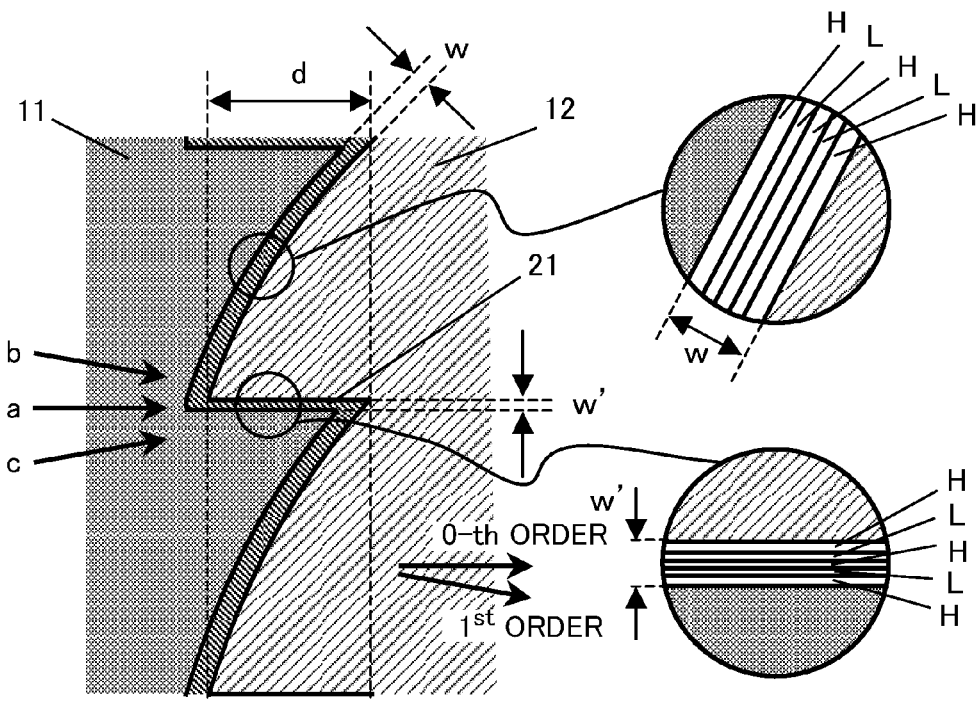
FIG. 25 is a partially enlarged sectional view of a diffractive optical element according to a fifth embodiment.

A fifth embodiment is similar to the fourth embodiment but different from the fourth embodiment in that a total thickness of the thin film on the grating surface differs from a total thickness of the thin film on the grating wall surface. In other words, the total thickness of the thin film differs according to a position on the interface. FIG. 25 is an enlarged sectional view of the diffraction grating according to the fifth embodiment. For better understanding, FIG. 25 is exaggeratedly deformed in the grating periodic direction.

The thin film 21 is a multilayer film that includes 20H, 19L, 229H, 22L, and 19H in order from the diffraction grating 11 to the diffraction grating 12. Here, "H" denotes a high refractive index layer ($TiO_2$ layer), "L" denotes a low refractive index layer ($SiO_2$ layer), and a numerical value denotes a physical film thickness (nm). In the five-layer thin film, one high refractive index thin film is designed physically thicker than another layer. A film thickness of the thin film 21 on the grating wall surface is set half a physical thickness, and more specifically includes 10H, 10L, 115H, 11L, and 10H. In the five-layer thin film, one high refractive index thin film is designed physically thicker than another layer. For (an incident light flux "a" having) an incident angle of 0° as the designed incident angle on the grating surface of the DOE, it is designed so that the transmittance of the overall visible range (430 nm to 670 nm) can be 99.0% or higher.

Figure 26:
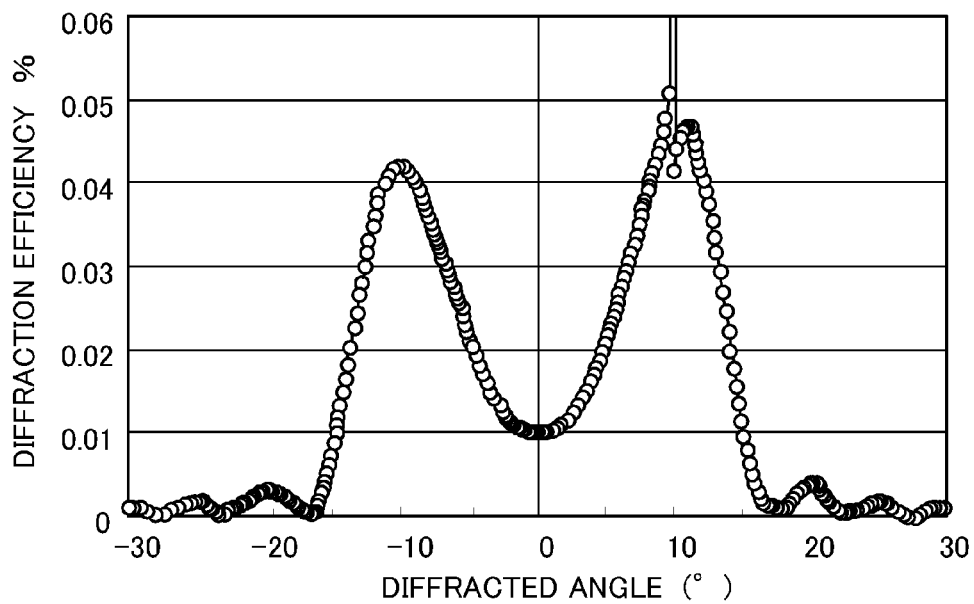
FIG. 26 is a graph of diffraction efficiency of the diffractive optical element illustrated in FIG. 25 to an off-screen light flux having an incident angle of +10° according to the fifth embodiment.

FIG. 26 is a graph of an RCWA calculation result with an incident angle of $+10°$, a grating pitch of 100 μm, and a wavelength of 550 nm for the incident light flux "b" in FIG. 25 and the incident light flux "B" illustrated in FIG. 6.

The $+1^{st}$ order diffracted light as the designed order provides the highest diffraction efficiency, but this +1st order diffracted light never reaches the image plane and its influence is small. Similar to the first embodiment, it is understood that the remaining unnecessary light becomes unnecessary light having a peak in the specific angle direction and propagates.

The peak angle of the unnecessary light in the $-10°$ direction is approximate the same as that of FIG. 8B, but a spread of the unnecessary light is different between FIG. 26 and FIG. 8B and FIG. 26 illustrates lower diffraction efficiency at a low diffracted angle. In other words, a quantity of unnecessary light at the low diffracted angle (the light fluxes "b1" in FIG. 9) is reduced according to this embodiment.

In the optical system illustrated in FIGS. 5 and 6, at least the diffracted light of the unnecessary light derived from the off-screen light reaches the image plane, when the diffracted light has a diffracted angle approximately equal to the diffracted angle of $+0.20°$ at which the designed diffracted order at the designed incident angle is propagated. From the RCWA calculation result, the diffraction efficiency near the diffracted angle of $+0.20°$ in FIG. 26 is 0.010% for the diffracted order of a $-46^{th}$ order, and 0.010% for the diffracted order of a $-47^{th}$ order. Thus, similar to FIG. 7B, the diffraction efficiency is remarkably reduced.

Figure 27:
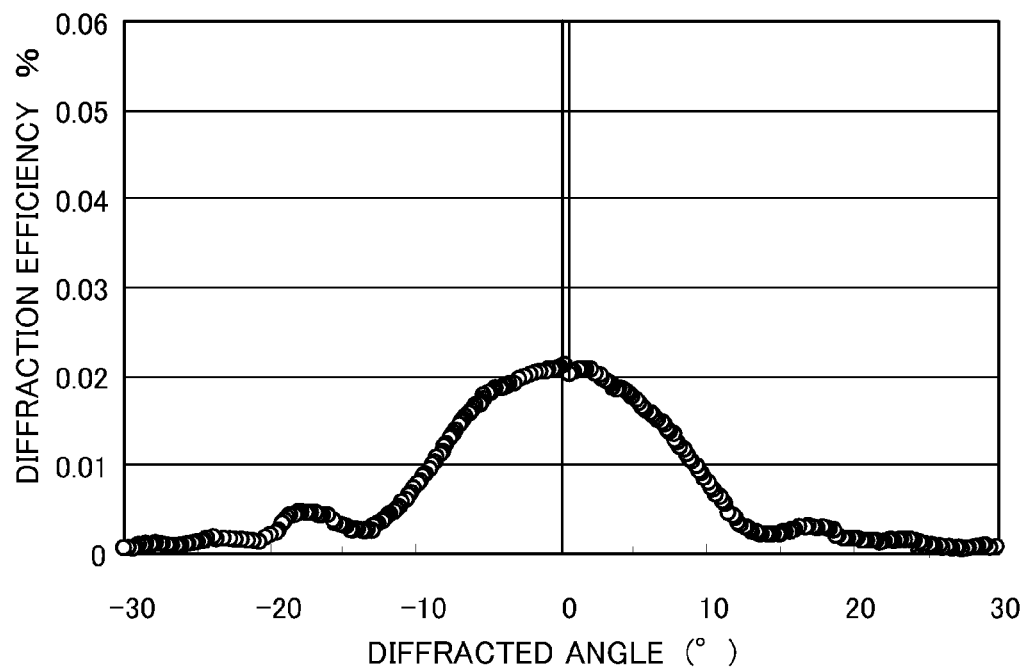
FIG. 27 is a graph of diffraction efficiency of the diffractive optical element to a designed incident light flux according to the fifth embodiment.

FIG. 27 is a graph of an RCWA calculation result with an incident angle of 0°, a grating pitch of 100 µm, and a wavelength of 550 nm by supposing the incident light flux "a" illustrated in FIG. 4.

The diffraction efficiency of the $+1^{st}$ order diffracted light as the designed order is 97.90% and lower than that of the diffraction grating that has no thin film. The remaining light becomes unnecessary light, and propagates similar to the first embodiment. As a result of that this thin film causes a phase shift, the diffraction efficiency of a comparatively low order (about $\pm 35^{th}$ orders at diffracted angles $\pm 10°$) increases and the diffraction efficiency of the $+1^{st}$ order diffracted light as the designed order decreases.

When the overall DOE region is considered, a reduced amount of the diffraction efficiency by 0.86% with this grating pitch of 100 µm is seldom influential or problematic because it is rare to directly capture a high brightness light source, such as the sun, in daylight at the designed incident angle (the incident angle of the image pickup light). The influence of the unnecessary light is also small.

Figure 28:
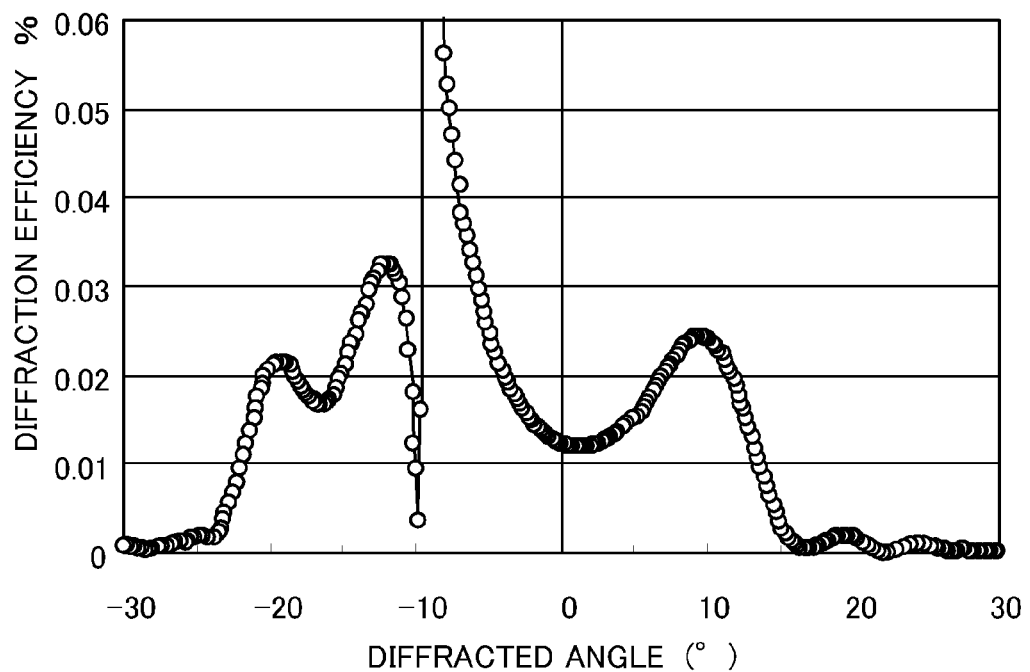
FIG. 28 is a graph of diffraction efficiency of the diffractive optical element to an off-screen light flux having an incident angle of −10° according to the fifth embodiment.

FIG. 28 is a graph of an RCWA calculation result with an incident angle of $-10°$, a grating pitch of 100 µm, and a wavelength of 550 nm by supposing the incident light flux "c" illustrated in FIG. 4.

As illustrated in FIG. 28, the $+1^{st}$ order diffracted light as the designed order provides the highest diffraction efficiency, but this $+1^{st}$ order diffracted light never reaches the image plane and its influence is small. Similar to the first embodiment, it is understood that the remaining unnecessary light becomes unnecessary light having a peak in the specific angle direction and propagates. As illustrated in FIGS. 2, 5, and 6, at least the diffracted light of the unnecessary light derived from the off-screen light reaches the image plane, when the diffracted light has a diffracted angle approximately equal to the diffracted angle of +0.20° at which the designed diffracted order at the designed incident angle is propagated. From the RCWA calculation result, the diffraction efficiency near the diffracted angle of +0.20° in FIG. 28 is 0.013% for the diffracted order of a $+49^{th}$ order, and 0.013% for the diffracted order of a $+48^{th}$ order. Although this embodiment has higher diffraction efficiencies than the diffraction grating that has no thin film, the values of the diffraction efficiency are extremely small and less influential on the deterioration of the imaging performance.

Thus, this embodiment provides a thin film to the optical system to which the DOE of this embodiment is applied, and restrains an increase of the less influential unnecessary light of the m'-th grating to the non-influential level and remarkably decreases the influential unnecessary light of the m-th grating. As a result, a quantity of unnecessary light that reaches the imaging plane reduces and the deterioration of the imaging performance can be restrained. At the same time, the reduction of the diffraction efficiency of the designed order can be restrained to the non-influential level on the imaging performance.

As in this embodiment, the thickness of the film thickness on the grating surface may be different from that on the grating wall surface. This embodiment can more easily and less expensively manufacture the DOE. In an example, when the thin film is formed by the vacuum evaporation, a film thickness on the serrated grating surface is generally different from a film thickness on the grating wall surface in the Blazed grating, and moreover the film thickness is also different when the diffraction grating is produced on a lens surface as illustrated in FIG. 3. Therefore, by arbitrarily designing the antireflection function of the grating surface and the flare reducing function of the grating wall surface in accordance with the manufacturing method, a reduction of the diffraction efficiency of the designed order and a reduction of the unnecessary light caused by the off-screen light flux can be compromised. One illustrative manufacturing method is similar to that of the fourth embodiment.

Table 1 summarizes the results of the first to fifth embodiments. Here, nd1 is a refractive index of the diffraction grating 11 to the d-line, nd2 is a refractive index of the diffraction grating 12 to the d-line, νd1 is an Abbe number of the diffraction grating 11, and νd2 is an Abbe number of the diffraction grating 12, θgF1 is a partial dispersion ratio of the diffraction grating 11, and θgF2 is a partial dispersion ratio of the diffraction grating 12. Moreover, n1_550 is a refractive index of a wavelength 550 nm of the diffraction grating 11, n2_550 is a refractive index of a wavelength 550 nm of the diffraction grating 12, d is a grating height of the DOE, and W is a total thickness (width) of the thin film, and w is a maximum film thickness of the thin film that includes a single material. The diffraction efficiency (%) in the table is obtained by the RCWA calculation result with an incident angle of +10°, a grating pitch of 100 µm for the diffracted order of the $-46^{th}$ order and the diffracted order of the $-47^{th}$ order corresponding to the incident light flux "B." Table 1 indicates a film thickness on the grating surface for the fifth embodiment:

TABLE 1

| | FIRST EMBOD. | SECOND EMBOD. | THIRD EMBOD. | FOURTH EMBOD. | FIFTH EMBOD. |
|---|---|---|---|---|---|
| nd1 | 1.504 | 1.504 | 1.504 | 1.504 | 1.504 |
| nd2 | 1.567 | 1.567 | 1.567 | 1.567 | 1.567 |
| nd3 | 2.323 | 2.323 | 2.154 | 2.323/ 1.482 | 2.323/ 1.482 |
| nd3 – nd1 | 0.819 | 0.819 | 0.650 | 0.819 | 0.819 |
| nd3 – nd2 | 0.756 | 0.756 | 0.587 | 0.756 | 0.756 |
| nd2 – nd1 | 0.063 | 0.063 | 0.063 | 0.063 | 0.063 |
| DIFFRACTION EFFICIENCY (%) | | | | | |
| DIFFRACTED ORDER: $-46^{th}$ ORDER | 0.0084 | 0.0065 | 0.0067 | 0.010 | 0.010 |
| DIFFRACTED ORDER: $-47^{th}$ ORDER | 0.0083 | 0.0074 | 0.0067 | 0.010 | 0.010 |
| TOTAL THICKNESS W (µm) OF DIELECTRIC THIN FILM | 0.1 | 1.0 | 0.1 | 0.205 | 0.309 |
| MAXIMUM FILM (LAYER) THICKNESS w (µm) | 0.1 | 1.0 | 0.1 | 0.120 | 0.229 |

As illustrated in the first to fifth embodiments, the refractive indexes nd1 and nd2 of the diffraction gratings 11 and 12 that are closely adhered to each other via the thin film and the refractive index nd3 of the material of one layer in the thin film to the d-line satisfy Expression 1 and can reduce the unnecessary light that would otherwise reach the imaging surface. The thickness of the thin film may satisfy Expression 2 so as to prevent the deterioration of the imaging performance. In addition, Expression 3 may be satisfied in order to prevent the reduction of the flare reduction effect.

The first to fifth embodiments satisfy the refractive index relationship between the diffraction gratings 11 and 12 as in the following conditional expression. Since this refractive index difference provides a transmittance of 99% or greater, it is usually unnecessary to provide an antireflection film on the interface. However, the first to fifth embodiments provide the antireflection film and reduces the unnecessary light:

$$0 < nd2-nd1 < 0.223 \qquad \text{Expression 4}$$

In this embodiment, nd2−nd1=0.063 and corresponds to a reflectance difference of 1% or smaller between the diffraction gratings 11 and 12.

This embodiment discusses a case where nd2 is larger than nd1, which is a refractive index of the material of the diffraction grating 11 to the d-line. However, in general, Expression 4 means that a value made by subtracting a smaller one of the refractive index of the material of the first diffraction grating to the d-line and the refractive index of the material of the second diffraction grating to the d-line from a larger one of them is 0.223 or smaller.

It is not always necessary to provide a thin film onto all annuluses or the thin film may be provided only onto part of the annulus. In this case, it is effective to provide a thin film to part including a minimum grating pitch. This is because a diffraction grating having a smaller grating pitch has larger diffraction efficiency of unnecessary light and thus the contribution of the unnecessary light that is generated by the entire DOE is large.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-133972, filed Jun. 11, 2010, which is hereby incorporated by reference herein in its entirety.

What is claimed is:

1. A diffractive optical element comprising:
    a first diffraction grating and a second diffraction grating made of materials different from each other and are stacked in an optical axis direction, the first and second diffraction gratings each having a grating wall surface; and
    a thin film arranged at an interface between the grating wall surface of the first diffraction grating and the grating wall surface of the second diffraction grating,
    wherein the thin film is composed of a single layer or multiple layers of materials different from the materials of the first and second diffraction gratings, and is transparent to light of a working wavelength range,
    wherein the following conditional expressions are satisfied to enable the thin film to function as an optical wave guide when light is incident obliquely thereto:

$nd1 < nd2$;

$0.5 < nd3-nd2 < 0.8$;

$0 < w < 2$ µm; and $0 < W/P < 0.05$, where nd1 is a refractive index of the material of the first diffraction grating to d-line, nd2 is a refractive index of the material of the second diffraction grating to the d-line, nd3 is a maximum refractive index of the material of one layer of the thin film to the d-line, w is a maximum thickness of the one layer having the maximum refractive index in the thin film, W is a total thickness of the thin film, and P is a grating pitch.

2. The diffractive optical element according to claim 1, wherein the following conditional expression is satisfied:

$0 < nd2-nd1 < 0.223$.

3. The diffractive optical element according to claim 1, wherein the thin film is arranged only at the interface between the wall surface of the first diffraction grating and the grating wall surface of the second diffraction grating.

4. The diffractive optical element according to claim 1, wherein:
    the thin film includes multiple layers arranged with layers of higher and lower refractive indices, and
    a layer having the higher refractive index is physically thicker than a layer having the lower refractive index among the multiple layers.

5. The diffractive optical element according to claim 4, wherein the multiple layers include a layer having a refractive index of 2.323 to the d-line and a layer having a refractive index of 1.482 to the d-line.

6. The diffractive optical element according to claim 5, wherein the material of the layer having the higher refractive index is $TiO_2$, and the material of the layer having the lower refractive index is $SiO_2$.

7. The diffractive optical element according to claim 1, wherein:
    the thin film is also arranged at an interface between grating surface of the first diffraction grating and grating surface of the second diffraction grating, and
    a total thickness of the thin film arranged at the interface between the grating wall surface of the first diffraction grating and the grating wall surface of the second diffraction grating differs from a total thickness of the thin film arranged at the interface between the grating surface of the first diffraction grating and the grating surface of the second diffraction grating.

8. The diffractive optical element according to claim 1, wherein the thin film satisfies the following expression:

$nd3=2.323$.

9. The diffractive optical element according to claim 1, wherein the material of the one layer of the thin film having the maximum refractive index is $TiO_2$.

10. The diffractive optical element according to claim 1, wherein the thin film satisfies the following expression:

$nd3=2.154$.

11. The diffractive optical element according to claim 1, wherein the material of the one layer of the thin film having the maximum refractive index is $Ta_2O_5$.

12. The diffractive optical element according to claim 1, wherein the grating pitch is 100 µm.

13. The diffractive optical element according to claim 1, wherein the grating pitch varies and becomes larger from an outer periphery of the optical element toward an optical axis of the diffractive optical element.

14. The diffractive optical element according to claim 1, wherein in the first diffraction grating, a refractive index to the d-line is 1.504, an Abbe number to the d-line is 16.3, a partial dispersion ratio is 0.390, and a refractive index to a wavelength of 550 nm is 1.511, and in the second diffraction grating, a refractive index to the d-line is 1.567, an Abbe number to the d-line is 47.0, a partial dispersion ratio is 0.569, and a refractive index to a wavelength of 550 nm is 1.570.

15. An optical system comprising:
a diffractive optical element; and
a stop arranged at a downstream side of an optical path of the diffractive optical element,
wherein the diffractive optical element comprises:
a first diffraction grating and a second diffraction grating made of materials different from each other and are stacked in an optical axis direction, the first and second diffraction gratings each having a grating wall surface; and
a thin film arranged at an interface between the grating wall surface of the first diffraction grating and the grating wall surface of the second diffraction grating,
wherein the thin film is composed of a single layer or multiple layers of materials different from the materials of the first and second diffraction gratings, and is transparent to light of a working wavelength range,
wherein the following conditional expressions are satisfied to enable the thin film to function as an optical wave guide when light is incident obliquely thereto:

$nd1 < nd2;$ $0.5 < nd3 - nd2 < 0.8;$ $0 < w < 2 \,\mu m;$ and $0 < W/P < 0.05,$ where nd1 is a refractive index of the material of the first diffraction grating to d-line, nd2 is a refractive index of the material of the second diffraction grating to the d-line, nd3 is a maximum refractive index of the material of one layer of the thin film to the d-line, w is a maximum thickness of the one layer having the maximum refractive index in the thin film, W is a total thickness of the thin film, and P is a grating pitch.

16. A diffractive optical element comprising:
a first diffraction grating and a second diffraction grating made of materials different from each other and are stacked in an optical axis direction; and
a thin film arranged at least part of an interface between the first diffraction grating and the second diffraction grating, and functions as an optical wave guide when light is incident obliquely thereto,
wherein the thin film is composed of multiple layers of materials different from the materials of the first and second diffraction gratings, and is transparent to light of a working wavelength range,
wherein the multiple layers of the thin film are arranged with layers of higher and lower refractive indices, and
wherein a layer having the higher refractive index is physically thicker than a layer having the lower refractive index among the multiple layers.

17. A diffractive optical element comprising:
a first diffraction grating and a second diffraction grating made of materials different from each other and are stacked in an optical axis direction, the first and second diffraction gratings each having a grating wall surface; and
a thin film arranged at an interface between the grating wall surface of the first diffraction grating and the grating wall surface of the second diffraction grating,
wherein the thin film is composed of a single layer or multiple layers of materials different from the materials of the first and second diffraction gratings, and is transparent to light of a working wavelength range,
wherein the following conditional expressions are satisfied to enable the thin film to function as an optical wave guide when light is incident obliquely thereto:

$nd1 < nd2;$ $0.5 < nd3 - nd2 < 0.8;$ $0 < w < 2 \,\mu m;$ and $0 < W/P < 0.05,$ where nd1 is a refractive index of the material of the first diffraction grating to d-line, nd2 is a refractive index of the material of the second diffraction grating to the d-line, nd3 is a maximum refractive index of the material of one layer of the thin film to the d-line, w is a maximum thickness of the one layer having the maximum refractive index in the thin film, W is a total thickness of the thin film, and P is a grating pitch, and
wherein the material of the first diffraction grating is fluorine acrylic UV curing resin mixed with ITO nanoparticles, and the material of the second diffraction grating is acrylic UV curing resin mixed with $ZrO_2$ nanoparticles.

* * * * *